(12) United States Patent
Benjamin et al.

(10) Patent No.: US 11,412,011 B1
(45) Date of Patent: Aug. 9, 2022

(54) METHODS, SYSTEMS, APPARATUSES, AND DEVICES FOR FACILITATING INTERACTION BETWEEN USERS VIEWING SAME WEBPAGES AND VIRTUAL LOCATIONS

(71) Applicants: Daveed Benjamin, Oakland, CA (US); Phillip Joseph Ross, Saltsburg, PA (US)

(72) Inventors: Daveed Benjamin, Oakland, CA (US); Phillip Joseph Ross, Saltsburg, PA (US)

(73) Assignee: Bridgit To The Future, Inc., Oakland, CA (US)

( * ) Notice: Subject to any disclaimer, the term of this patent is extended or adjusted under 35 U.S.C. 154(b) by 0 days.

(21) Appl. No.: 17/531,856

(22) Filed: Nov. 22, 2021

Related U.S. Application Data

(60) Provisional application No. 63/081,935, filed on Sep. 23, 2020.

(51) Int. Cl.
| | |
|---|---|
| *G06F 15/16* | (2006.01) |
| *H04L 65/401* | (2022.01) |
| *H04L 65/403* | (2022.01) |
| *H04L 67/52* | (2022.01) |
| *H04L 67/54* | (2022.01) |
| *H04L 67/02* | (2022.01) |

(52) U.S. Cl.
CPC ........ *H04L 65/4007* (2013.01); *H04L 65/403* (2013.01); *H04L 67/02* (2013.01); *H04L 67/18* (2013.01); *H04L 67/24* (2013.01)

(58) Field of Classification Search
CPC ... H04L 65/4007; H04L 65/403; H04L 67/02; H04L 67/18; H04L 67/24
USPC ........................................................ 709/204
See application file for complete search history.

(56) References Cited

U.S. PATENT DOCUMENTS

| | | | |
|---|---|---|---|
| 7,478,129 B1* | 1/2009 | Chemtob | H04L 12/1827 709/204 |
| 9,413,826 B1* | 8/2016 | Dietz | G06F 16/1824 |
| 2008/0250149 A1* | 10/2008 | Morris | H04L 67/24 709/229 |
| 2011/0087749 A1* | 4/2011 | Swink | H04L 61/1594 709/206 |
| 2013/0111025 A1* | 5/2013 | Sampathkumaran | G06F 9/526 709/225 |

(Continued)

*Primary Examiner* — Alan S Chou
(74) *Attorney, Agent, or Firm* — Dhiraj Jindal; Patent Yogi LLC

(57) ABSTRACT

A method and system for facilitating interaction between users viewing same digital contents is provided. Further, the method may include a step of receiving one or more second digital content requests of the digital content. Further, the method may include a step of analyzing the first digital content request and the one or more second digital content requests. Further, the method may include a step of determining a simultaneous access of the digital content from the first user device and the one or more second user devices based on the analyzing. Further, the method may include a step of generating a notification for the simultaneous access of the digital content based on the determining. Further, the method may include a step of transmitting the notification to one or more of the first user device and the one or more second user devices.

16 Claims, 31 Drawing Sheets

(56) References Cited

U.S. PATENT DOCUMENTS

| | | | |
|---|---|---|---|
| 2014/0214503 A1* | 7/2014 | Chircorian | G06F 21/62 |
| | | | 726/28 |
| 2015/0081773 A1* | 3/2015 | Ansel | G06F 40/197 |
| | | | 707/639 |
| 2016/0119395 A1* | 4/2016 | Li | H04L 12/189 |
| | | | 709/219 |
| 2017/0013311 A1* | 1/2017 | Napier | H04N 21/436 |
| 2017/0104863 A1* | 4/2017 | Turim | H04L 67/02 |

* cited by examiner

The Highly Contemporary UI/U31 Design from a Silicon Valley.

Our Studio · Journal · Services · Insights · Contact Us · Careers

Light / Dark

Scroll to top

Presence — 1100

Visible visitors in the Canopy: 56
Meet new people in the Canopy with the Presence Overlay — 1120

Fredda
Time on Site: 10 Hrs ago
Workplace: Micron Technology Inc., Arizona
College: University of Advancing Technology
High School: St. 31avier's High School
Location: Arizona
[More] — 1130

Jason
Time on Site: 10 Hrs ago
High School: Florida State Collage, Florida
College: Hampton High School, Iowa
Location: Arizona
[More]

Greg
Time on Site: 10 Hrs ago
High School: St. Francis High School, Maryland
Location: Maryland
[More]

[Go Visible] — 1140

METHODS, SYSTEMS, APPARATUSES, AND DEVICES FOR FACILITATING INTERACTION BETWEEN USERS VIEWING SAME WEBPAGES AND VIRTUAL LOCATIONS

CROSS-REFERENCE TO RELATED APPLICATIONS

The current application claims a priority to the U.S. provisional patent application Ser. No. 63/081,935 filed on Sep. 23, 2020.

TECHNICAL FIELD

Generally, the present disclosure relates to the field of data processing. More specifically, the present disclosure relates to methods, systems, apparatuses, and devices for facilitating interaction between users viewing the same webpages and virtual locations.

BACKGROUND

The field of data processing is technologically important to several industries, business organizations, and/or individuals.

Social networking applications bring people together. But web browsing outside of social networks is isolating. The existing social networks are confined to interactivity and content creation only within the social network's walls. But there is no functionality that allows people to interact over the general worldwide web.

Some social networks use a subscription or list model, where users "follow" or put other users on a "list," so that updates from followed and listed users will appear in the stream of updates available in the software client of following users. Other social networks use a "friend" model, where one user will request a connection with another user; if the connection is accepted, the users may see each other's updates through the social network. Other social networks use a combination of both types of approaches.

Updates that occur on current social networks are generally based on one of two approaches: pushing updates out to other users using a special protocol designed for communicating within that network or posting updates to a single site where other users may view them through a Web browser or client application. Some social networks provide both stand-alone software clients (including mobile clients) and Web sites.

Updates to current social networks often may be distributed at several different levels of granularity and restrictions on other user or third-party access, including public, meaning that anyone with access to the social network may see them; groups that a user may choose to join, but where the user has no control over the membership of that group; or lists of friends or followers who may converse with a user directly.

Many social networks allow users to post a Uniform Resource Locator (URL), which provides a link to a webpage. The URL must be opened and the content available on it viewed in a browser window external to the social network. That is, a webpage referenced by the URL may be viewed or found from the social network, but the webpage content is not part of the social network's content.

Existing techniques for facilitating interaction between users viewing same webpages and virtual locations are deficient with regard to several aspects. For instance, current technologies do not allow users to interact with one another on just any webpage, e.g. Wikipedia™, and virtual locations, or any other non-social application. When the users interact with Wikipedia, there is no way of knowing who is on the page. Thus, the users are not able to meet, connect, communicate, interact, or collaborate on the same webpage and virtual locations, despite having a shared interest. Furthermore, current technologies do not allow the users to have a virtual presence on web pages and virtual locations and establish a basis for retrieving and displaying selected profile content, initiating the connection, communication, and for other applications to use their on-page presence.

Therefore, there is a need for methods, systems, apparatuses, and devices for facilitating interaction between users viewing same webpages and virtual locations that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating interaction between users viewing same digital contents, in accordance with some embodiments. The method may include a step of receiving, using a communication device, a first digital content request of a digital content. Further, the first digital content request may be transmitted from a first user device associated with a first user to a first client device for accessing the digital content. Further, the first client device hosts the digital content. Further, the method may include a step of receiving, using the communication device, one or more second digital content requests of the digital content. Further, the one or more second digital content requests may be transmitted from one or more second user devices associated with one or more second users to one or more second client devices for accessing the digital content. Further, the one or more second client devices host the digital content. Further, the method may include a step of analyzing, using a processing device, the first digital content request and the one or more second digital content requests. Further, the method may include a step of determining, using the processing device, a simultaneous access of the digital content from the first user device and the one or more second user devices based on the analyzing. Further, the method may include a step of generating, using the processing device, a notification for the simultaneous access of the digital content based on the determining. Further, the method may include a step of transmitting, using the communication device, the notification to one or more of the first user device and the one or more second user devices. Further, the notification informs the first user of simultaneous viewing of the digital content by the one or more second users and the one or more second users of the simultaneous viewing of the digital content by the first user.

Further disclosed herein is a system for facilitating interaction between users viewing same digital contents, in accordance with some embodiments. Accordingly, the system may include a communication device configured for receiving a first digital content request of a digital content. Further, the first digital content request may be transmitted from a first user device associated with a first user to a first client device for accessing the digital content. Further, the first client device hosts the digital content. Further, the communication device may be configured for receiving one or more second digital content requests of the digital content. Further, the one or more second digital content requests are transmitted from one or more second user devices associated with one or more second users to one or more second client devices for accessing the digital content. Further, the one or more second client devices host the digital content. Further, the communication device may be configured for transmitting a notification to at least one of the first user device and the one or more second user devices. Further, the notification informs the first user of simultaneous viewing of the digital content by the one or more second users and the one or more second users of the simultaneous viewing of the digital content by the first user. Further, the system may include a processing device communicatively coupled with the communication device. Further, the processing device may be configured for analyzing the first digital content request and the one or more second digital content requests. Further, the processing device may be configured for determining a simultaneous access of the digital content from the first user device and the one or more second user devices based on the analyzing. Further, the processing device may be configured for generating the notification for the simultaneous access of the digital content based on the determining.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 6 is a screenshot of a user interface facilitating a functionality that enables hosting or scheduling a live session on a webpage, in accordance with some embodiments.

FIG. 13 is a screenshot of a user interface facilitating allowing the user to see minimal profiles of people in the canopi, in accordance with some embodiments.

FIG. 17 is a screenshot of a user interface facilitating enabling the user to open most recent chats, in accordance with some embodiments.

DETAILED DESCRIPTION

Figure 1:
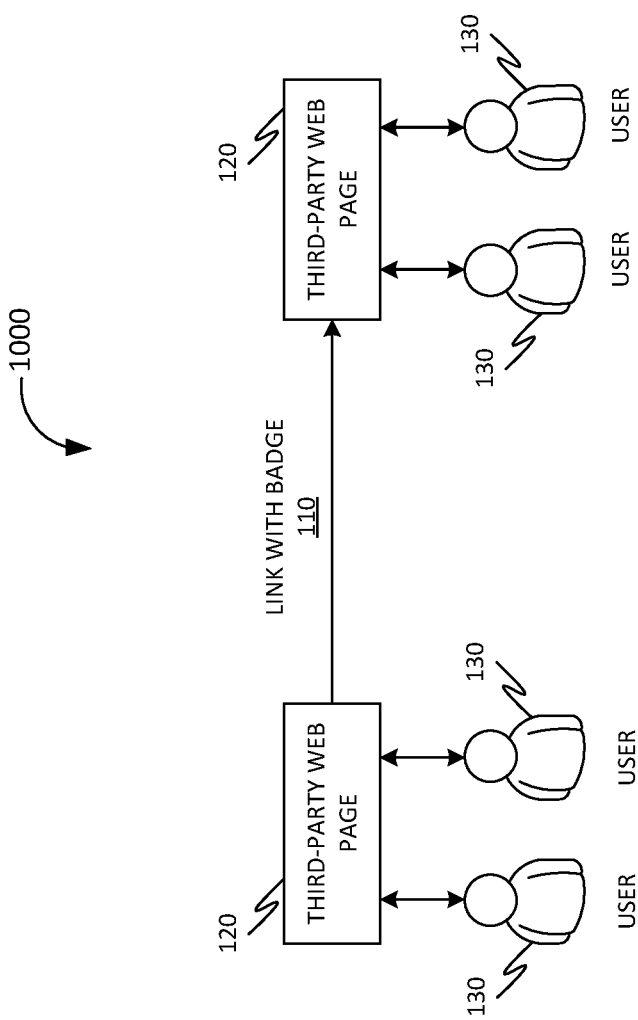
FIG. 1 is a schematic of a system illustrating users interacting visibly or invisibly using a webpage inside a novel social layer enabled by the disclosed system, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating interaction between users viewing same webpages and virtual locations, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on. Further, the method disclosed herein may be performed by one or more devices. Further, the one or more devices may be configured for accessing one or more addressable locations within one or more of a metaverse, a virtual reality, a mixed reality, and a spatial web.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor) associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating interaction between users viewing the same webpages and virtual locations. Further, the disclosed system may be configured for enabling users to have a visual presence and interact on a webpage. The disclosed system may enable the users to interact with each other within a context of a third-party webpage or another virtual location. Further, the disclosed system may be configured for providing functionality to enable a user to opt-in to be visible on the webpage; identifying other users; giving the user the knowledge that other visible users are real people, retrieving profiles of the users, and initiating communication with the other visible users, and interacting with active regions and doodles on web pages available to visible users who have opted-in, all without requiring any modification to a server-side source code of the third-party webpage. Further, the disclosed system may enable a novel social experience where users may engage with one another on any webpage. Further, the disclosed system may be associated with world wide web social networking, and more particularly to extending social content and interactivity to any webpage with content that goes beyond the general confines or an application specifically designed for social networking.

Further, the disclosed system provides a new type of social network. Conceptually, the social network may include a layer over the existing World Wide Web. The disclosed system enables the users to create an account, to log in and opt-in to be visible, to be identified by others, and to interact with others in a multitude of ways on the webpage. The network aggregates the data about the users, their visibility statuses, and their cursor's locations. For example, visible users may see each other on a third-party webpage, and they may choose to initiate a conversation.

Further, in some embodiments, the disclosed system may allow the users to create chat windows on any webpage that give connected users the ability to comment on content available on that page. A display page shows available marked up webpages.

Further, the result is a worldwide web social network for interacting with others who are browsing the same page and sharing thoughts and information in a new way.

Further, in some embodiments, the disclosed system allows the users to connect in a variety of ways. Further, the disclosed system may allow the users to follow or subscribe to the markups created by other users. Followed users' markups appear in the feeds of their followers.

Further, in some embodiments, the disclosed system notifies followers of new markups so that followers may actively seek out and review those new markups on the web pages. Markups of followed users may also be selected to be visible when a follower happens to navigate to a page the followed user has already marked up.

Further, in some embodiments, the disclosed system may allow a user to identify the other users who are geographically close by. Further in an embodiment, the user may see markups from those users who may be located using geo-location services. The disclosed system may also be used on an intranet or use a company directory to limit access to employees, or even to particular groups of employees.

Further, in some embodiments, the disclosed system may allow a user to identify the other users who are in the same digital nation or other affinity group. Further, in an embodiment, the user may opt in to see only markups from those users within the group.

Further, the disclosed system may be associated with a software platform (or software application or website). Further, for enterprise versions of the application, all data will be stored on a secure server separate from the free consumer version-and access will be based on the enterprise user's email address. Chats and other markups may be secured using known encryption and access controls techniques and technologies. For example, stored markups may be stored on the server in encrypted form and markups may be transmitted to a browser using encrypted communications. Chats may be further secured by using such access controls as access lists and/or password authentication. The admins of the software platform may limit access to otherwise hide content and messages on their platform and may block or otherwise restrict specific users or groups of users, The disclosed system provides a number of markup tools, including highlighting text, adding text notes, drawing shapes around elements of a webpage, adding images to a webpage, embedding audio or video, and a chat area. Each markup may optionally include a visual indicator associated with the user who added it. This visual indicator could be, for example, the display of a username and image (such as an avatar) next to the annotation or an information box that appears when a user mouses over the markup.

Further, the disclosed social network may allow the users to easily identify and share useful or interesting content within a webpage. The social network also lets the users interact with each other directly on any webpage the users decide to meet or come in contact with when browsing information available on the web, for example, through a chat application and real-time marking and sharing of those marks.

Furthermore, embodiments may have a page-level chat and messages in the page-level chat and/or private chat rooms can be connected to specific pieces of content on the page.

Furthermore, embodiments may connect webpages with locations in the Metaverse, virtual reality, mixed reality, and/or digital twins of the physical reality.

Furthermore, the disclosed system may also be used in educational settings by centering the classroom curriculum and discussion on any webpage or group of pages on the Internet; where people may chat and mark up certain Internet content and discuss and view those comments and markups in real-time. The disclosed system may be especially useful for extending the online classroom setting to any webpage in an easy-to-use bookmarklet. Further, the disclosed system allows the users to stay on the page they've visited and interact with other users sitting on and interacting with that particular page. Moreover, the disclosed system works with any pre-existing third-party webpage without requiring modification of the webpage source code at the server.

Referring now to figures, As shown in FIG. 1, the users on a third-party webpage 100 may or may not choose to opt-in to be visible to others. Visible users 130 may see other visible users. Further, the users may see links with badges 110 that point to other third party webpages 120. The system will display a badge next to links with the total number of visible persons on the third-party webpage 100 corresponding to the link for the opted-in users.

Figure 2:
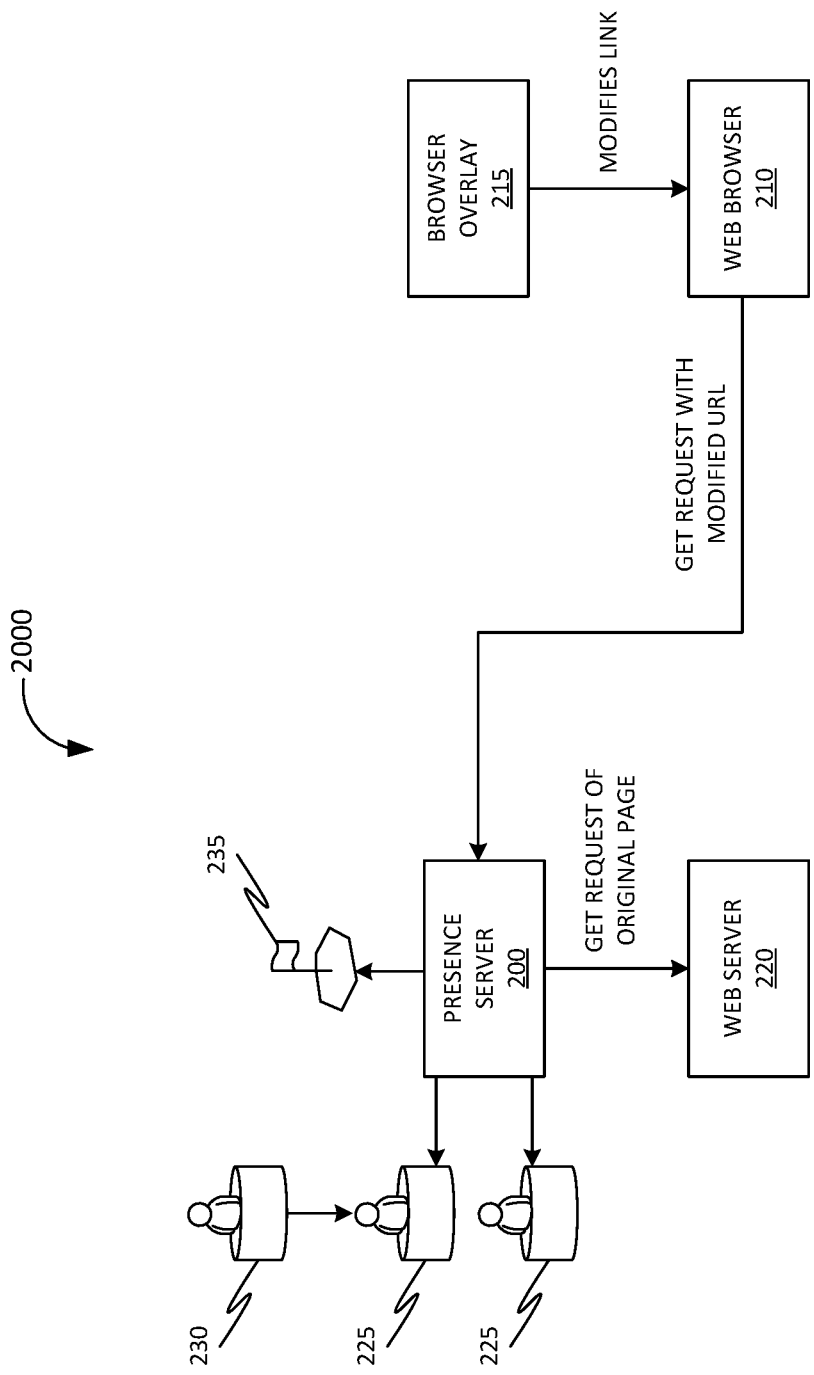
FIG. 2 is a schematic of a system for enabling user interaction, in accordance with some embodiments.
Figure 3:
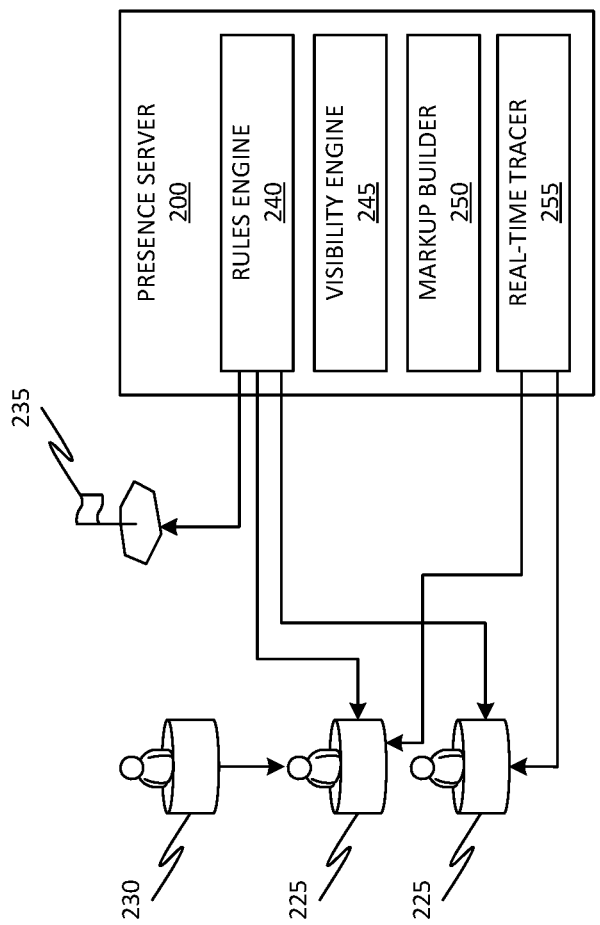
FIG. 3 is a block diagram of a Presence Server of the disclosed system, in accordance with some embodiments.

As shown in FIGS. 2 and 3, the Presence Server 200 is a software program that manages the visibility of personas on webpages. The Presence Server 200 enables users to see and interact on the webpages. The Presence Server 200 accesses a users' personal ledger 225 to access the rules, permissions, and preferences of users that have opted into being visible on a webpage. Some of the rules, permissions, and preferences in the user's personal ledger 225 may be from a personal ledger 230 of a parent or guardian.

Further, the Presence Server 200 also gets rules from a Digital Nation's ledger 235. The Presence Server 200 receives a modified GET request from a browsing user's web browser 210 and then sends the original GET request to a web server 220 of the requested page.

Further, a browser overlay 215 may be implemented as software with a web or mobile browser, a protocol implemented by a web or mobile browser, a web browser extension, a web application, an SDK loaded on a website, or a mobile app. The browser overlay 215 modifies links on the page displayed by the browsing user's web browser 210 so that GET requests are redirected from the original website to the Presence Server 200.

As shown in FIG. 3, the Presence Server 200 may have the following modules: a Rules Engine 240, a Visibility Engine 245, a Markup Builder 250, and a real-time tracer 255.

The Rules Engine 240 extracts the rules, permissions, and preferences from the ledgers of visible persons (or users) 225 including those from the personal ledger 230 of parent's or guardian's and the digital nation's ledger 235. This enables the system to understand what all the applicable rules, permissions, and preferences are in play with respect to each browsing user and the other visible personas on the page.

Based on the Rules engine 240, the Visibility Engine 245 compiles which of the visible users 225 that are visible to the browsing user. This enables the system to determine who may see whom, what information they may see, and how they may interact.

The Markup builder 250 creates the modified markup including the modified URLs which send requests to the Presence Server 200 as a proxy server to third-party websites. It also provides visibility information to the Presence Server 200. The Real-Time Tracer 255 tracks the position of the cursor or cursor icons of the visible users 225 that are visible to the browsing user and whether a user's cursor interacts with active regions or doodles. This enables the browsing user to see the location of the cursors of other visible users.

Further, in an embodiment, the system for enabling users to have a visual presence and interact on a webpage provides a user interface operating on a device and may be accomplished by a browser plugin, a browser, or an application with browser capabilities. During the course of web browsing, a user may be interested in knowing who is on a webpage at the same time.

In the browser control panel, a user may choose to move their visibility status indicator from invisible to visible for the active tab. If they remain invisible, they will see the totals for the number of personal connections, people in their groups, other criteria, and/or the public that are visible on the page at that moment. If they are visible, they may click through any of the totals to see the People selector widget that displays a search field; aggregations of the corresponding population of people visible on the website by a degree of separation, profile tags, and other potential sorting criteria; and a list of matching visible people.

The user may search or select elements of the aggregations to narrow the choices of visible people in the list. From the list, the user may review the profiles of visible people. The user will only see the selected elements of the profile of the visible person that is visible to the specific demographics of the user. Through the list, the user may initiate contact with a visible person, request a text message, or have an audio or video call.

The system or a digital nation may have rules that govern visibility including fees for being visible, free visibility monthly allocations, and restrictions of visibility by persona metadata, page metadata, and time periods. For example, The digital nation may have a free basic subscription that enables users to be visible for a set amount of time per month and have paid subscriptions or one-time fee options for users who want to be visible beyond the free plan. A digital nation may also limit users under the age of 18 from being visible at all or at certain times of day and/or on adult-oriented web pages.

Figure 4:
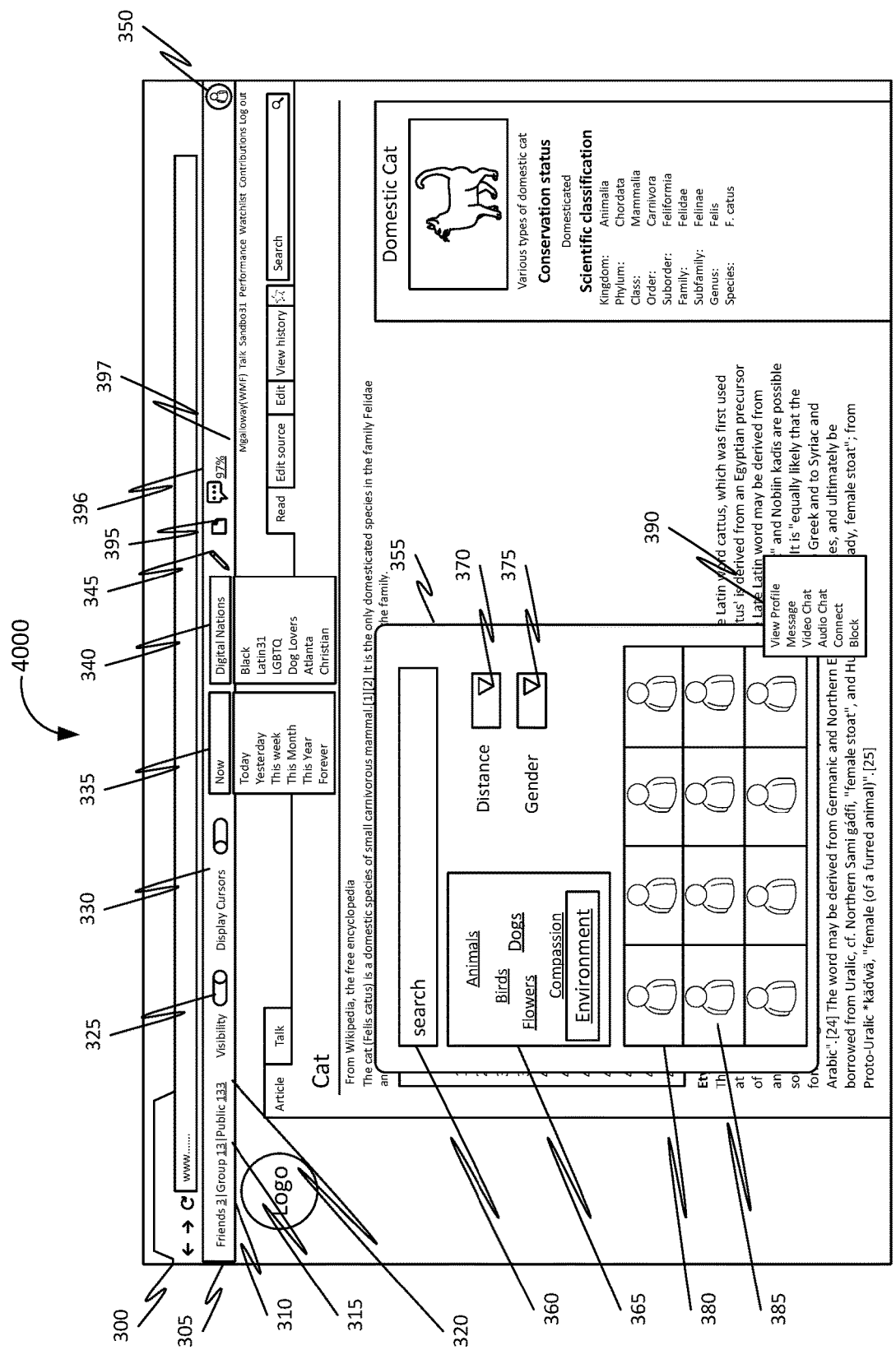
FIG. 4 is a screenshot of a user interface showing visibility layer on the web in the browser with filterable functionality, in accordance with some embodiments.

As shown in FIG. 4, if the system's implementation is a browser or browser protocol, the Presence controls 305 are above the content of a webpage 300 and in the browser's control panel. Otherwise, the Presence controls 305 may be implemented as an overlay along the top of the content, along the bottom of the browser's control panel, or in some other position potentially selected by the user.

The Presence controls 305 are links of the number of visible personas in a user's direct connections 310, in a user's groups 315, and in the public or a user's selected digital nations 320, a visibility toggle 325, a show cursors toggle 330, a timeframe for which visibility is of interest 335, a Digital Nations 340, an icon that links to doodling tools 345, and an icon for the persona for an active tab 350. There also may be icons for following the page (a follow icon 395), the page's chat 396, and the page's visibility score 397.

Further, the users may select the time period for which they would like to detect a user's presence. A visible person may specify the amount of time for which specific demographics of people may see their visible presence.

The system may work with an account from the browser for the user or another identification system. User accounts may have multiple personas, each with its own graphical, selfie camera, or live animated avatar. The Presence controls 305 have the icon of the active persona for the active tab 350. The user may change the active persona by clicking on the icon of the active tab 350 and selecting one of the personas authorized for use in the active digital nation(s).

Clicking a visible persona link 310, 315, 320 makes a visible personas filterable list 355 appear, which contains filter controls including a search field 360, a tag cloud 365, and potentially other demographics such as a distance 370 and a gender 375. Icons 385 for matching visible personas 380. The user may click or mouse over a persona and choose from a menu of actions 390 potentially including but not limited to viewing the user's profile; initiating a message, video chat, or audio chat; requesting a connection; and blocking users.

A user is able to follow a page by clicking the follow icon 395 on the Presence controls 305.

Users may choose to remain invisible to users with specific demographics or to become visible on a specific page. When visible, they may enable others to access selected elements of their profile to users with specific demographics. These rules are stored in the user's ledger 225.

Visible personas may as well choose whether and how to be visible on the page content. They may be visible as an avatar or a generic icon that displays at the position of their cursor.

Figure 5:
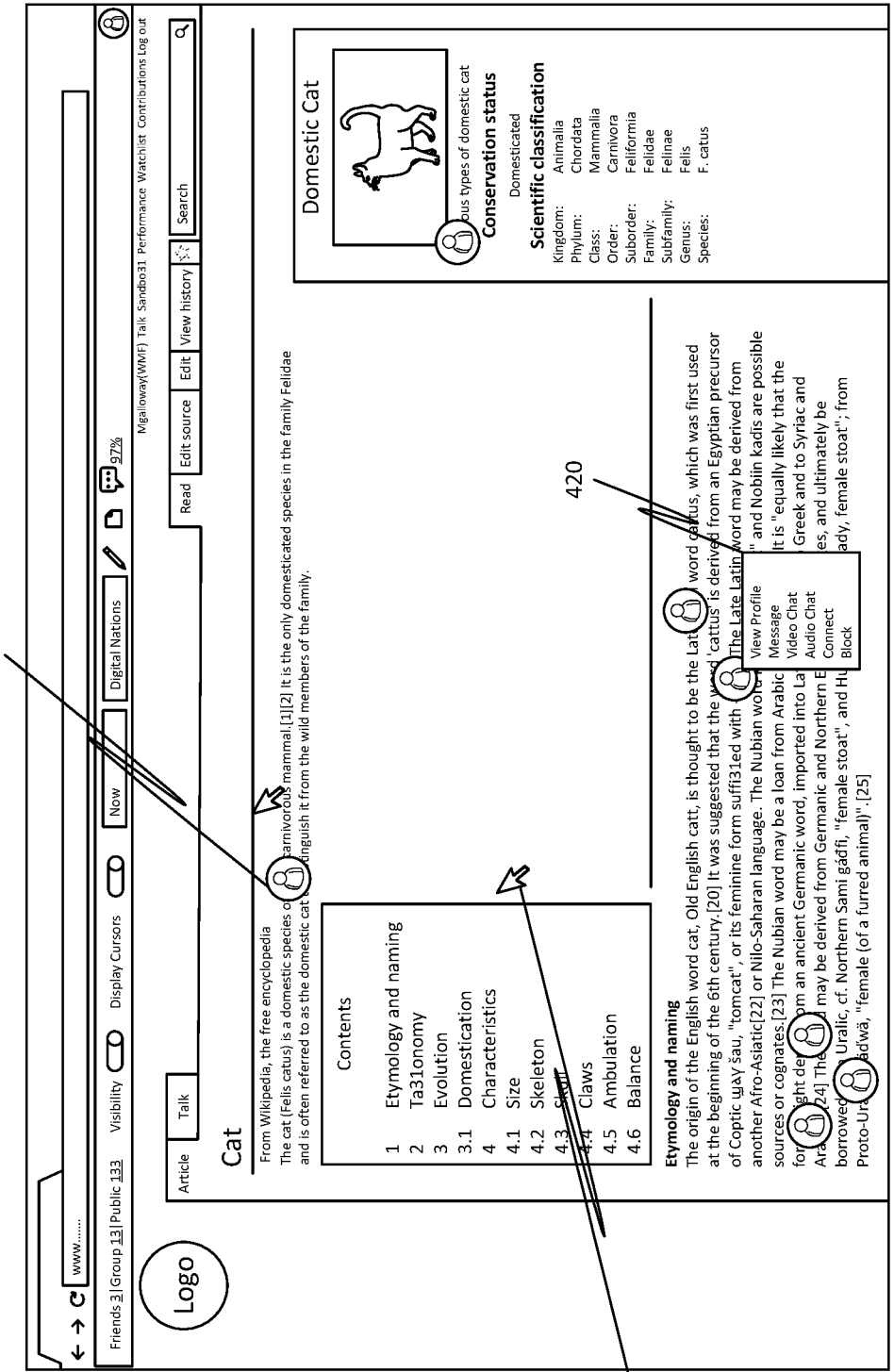
FIG. 5 is a screenshot of a user interface facilitating viewing of the visible users and enabling filtering functionality to narrow to a certain list, in accordance with some embodiments.

As shown in FIG. 5, the users may choose to see the avatar or icon of visible personas on-page content 400 and 410. Users may click a visible persona's avatar to see options potentially including but not limited to viewing the user's profile, initiating a message, video chat, or audio chat, connect, and block 420.

Further, the user may follow another visible persona. A visible person which of their personas are followable, which certain demographics may or cannot follow each persona, and what aspects of their visibility may be seen. Users will be notified when a user they are following goes visible.

Further, the users may block users. Users may see the total number of times that a user has been blocked. The total number of blocks or relative percentage across users over a time period may be used to exclude users from the display and/or lead to account deactivation.

Further, pages may have an overlay structure or space that the avatars or icons of visible people may enter. The space may have limitations to what demographics or groups may see and enter the space. Entering spaces enables the user to access live or recorded content, review documents, participate in the space's chat, and park their avatar in the space. Spaces may limit the extent to which users may park their avatars.

Further, a user may access a modal for the page's chat 395 by clicking the chat icon 396 on the Presence controls 305. Users may add a "@" to mention each other in the page's public chat. Users may designate that their chats are only available for their friends, specific groups, or specific digital nation(s) in which they are a member.

Further, the system may display an aggregate score for visibility of page 397 for the selected time period in the Presence controls 305 based on the relative percentage of the aggregate visibility across all pages in the system or some other measure of visibility that may or may not be selected by the user of the system. Clicking through on the visibility score link 397 displays more information about the page's visibility score over time.

Further, a user can go to a Presence webpage to see the history of visibility on a page over selected time periods. A user may go to a Presence webpage to see pages ranked in terms of visibility. A user may view the comparative visibility of multiple pages or sites over a selected time period.

Further, the users may also have visibility scores which indicate the relative percentage of the user is visible while they are active in the annotation layer (i.e., the OverWeb) during a specified time frame or for all time.

Further, the users may also have visibility scores for a specific page indicating the relative percentage of the user is visible while they are active in the annotation layer during a specified time frame or for all time. Further, the users may toggle between the relative percentage and actual percentage of time the user is visible on the system or a specific page.

Further, a low relative visibility score (e.g., 0-33%) means the user is visible less time than most users. A high relative visibility score (High: 67-100%) means the user is visible more time than most users.

An admin or a user may create templates of user video positions for use in overlay applications such as breakout groups, debates, meetings, virtual classrooms. These templates may specify positioning or video displays, any indicators, whether the user may navigate away from the video and whether the facilitator may bring them back, and chat configurations. Templates may include timed or untimed sequences based on a static or dynamic order of who is live on video. Users may pass before or during their turn to be live on video.

A user may specify their default visibility, whether to see cursor icons and/or an active overlay application that applies to all tabs and may be changed for specific tabs. Further, the user may invite one or more visible people to a text, video, or audio chat in the overlay on the page. The chat may be public, group, or private, disappearing, and encrypted. To ensure no misdeed, the platform will have access on a need-to-know basis to the encryption key for a predetermined period such as 30 days.

Further, the users may move their video or audio icon over the page. Users may change the skin, shape, or character of the icon.

If the system is accomplished within the scope of a random browser, clicking the plug-in icon in the browser control panel and/or an overlay icon button in the page content 400 and 410 displays a browser control panel for on-page presence. an overlay icon button on one of the upper corners or elsewhere on the page.

Further, the system may have analytics on attention, tags on pages including scores for a diversity of movement, main attention sinks, and other related functionality that helps to improve the user experience.

Further, in some embodiments, the system may incentivize users to be visible, to chat, and/or to accept communication requests by giving points for these actions.

Further, the system may display visibility scores that reflect the user's or a persona's relative visibility and potentially other measures.

Further, the system may display how many people follow a visible persona.

Figure 6:
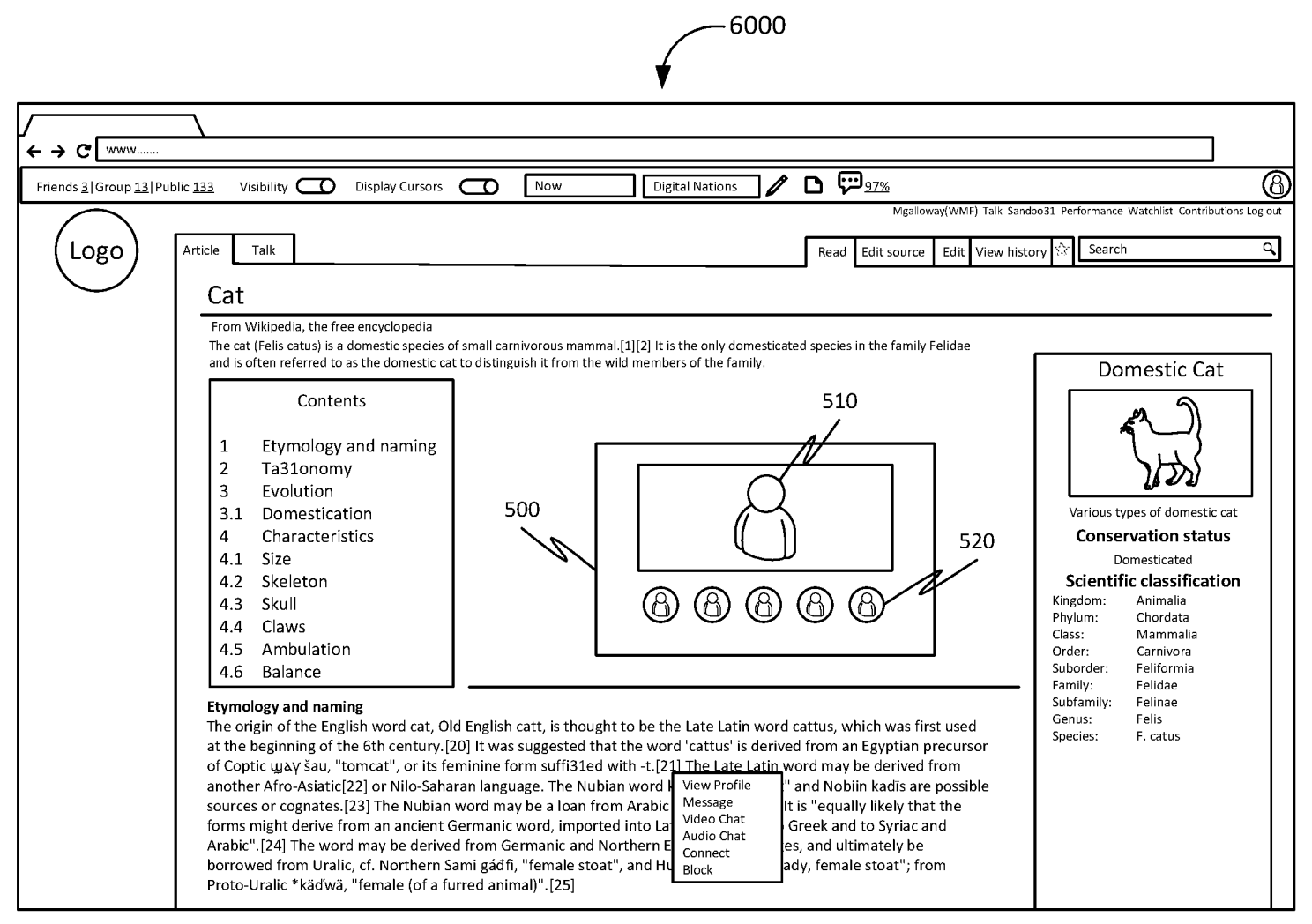

As shown in FIG. 6, a user may use a drag and drop interface to create active regions 510 over the webpage and/or over images that the user has uploaded and placed on a webpage 500. Users may add rules to the active regions 510. Further, the active region 510 may host a conversation or a meeting. There may be a speaker in the active region 510. Rules may specify actions for example who may see and enter the active region 510 as well as what media/ communications become available when they enter a region (e.g., a rectangle that 20 personas may enter at a time and if they do they may listen to a recorded audio message). A user 520 may choose to enter an active region 510 by moving their cursor into the active region 510.

Figure 7:
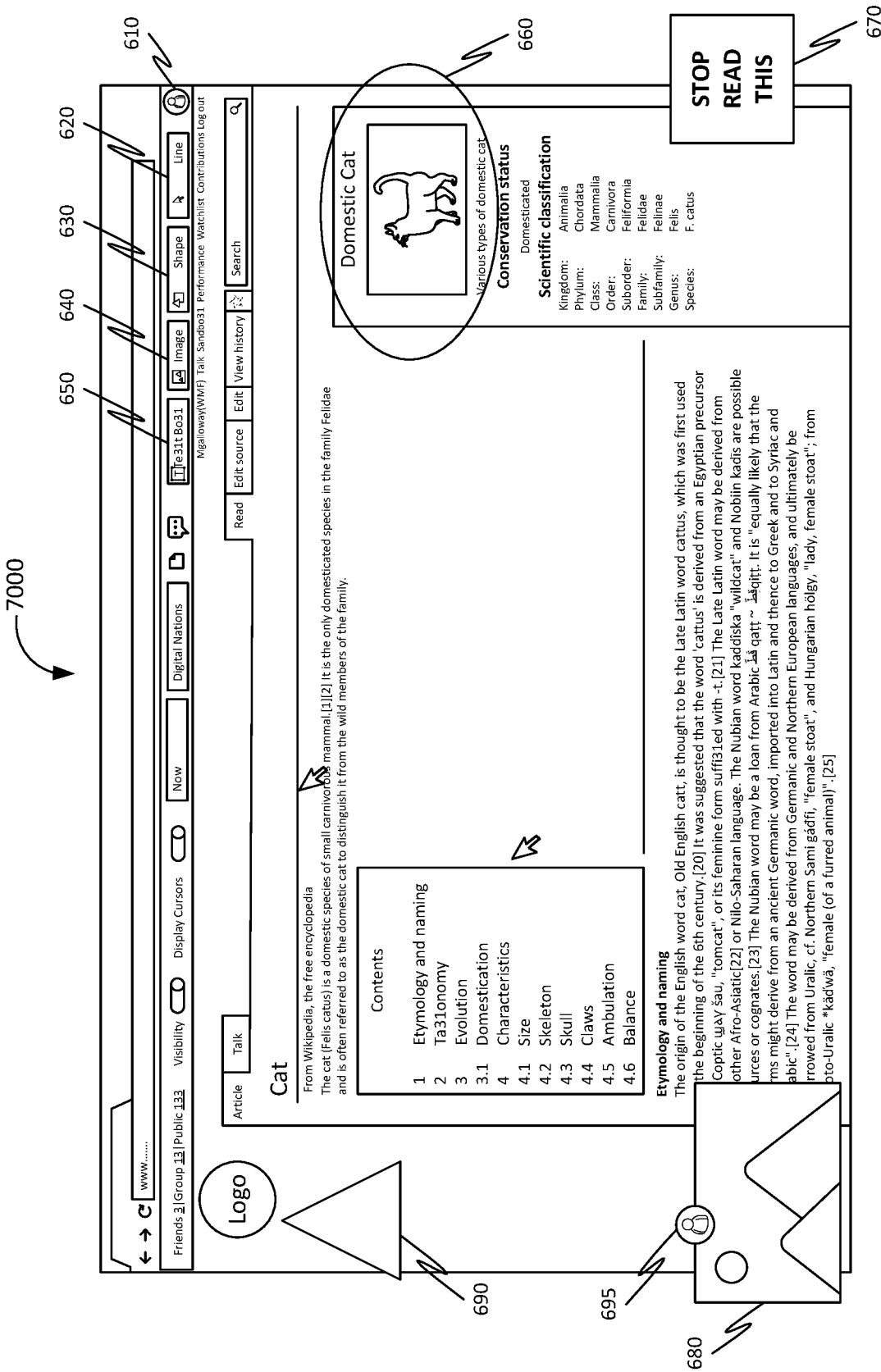
FIG. 7 is a screenshot of a user interface facilitating allowing users to markup and annotate pages inside the confines of the original webpage and outside of the original frame of the webpage, in accordance with some embodiments.

As shown in FIG. 7, the user may doodle on a page with lines 620, shapes 630, images 640, and text blocks 650 using a Doodle toolbar 610 in the Presence controls 305. The doodles 660, 670, 680, and 690 may have rules that specify actions such as who may see and enter an active item as well as what media/communications become available when they enter a region. The graffiti is not associated directly with the content but with the actual relative position on the page. Graffiti may extend beyond the edges of the page to create an infinite canvas for each page. A user 695 may interact with a doodle by moving their cursor to the doodle 680. If the doodle has portions that are off the page and the user 695 moves their cursor into the region of a doodle that is off the page, the screen will zoom out to display the rest of the active doodle 680.

Figure 8:
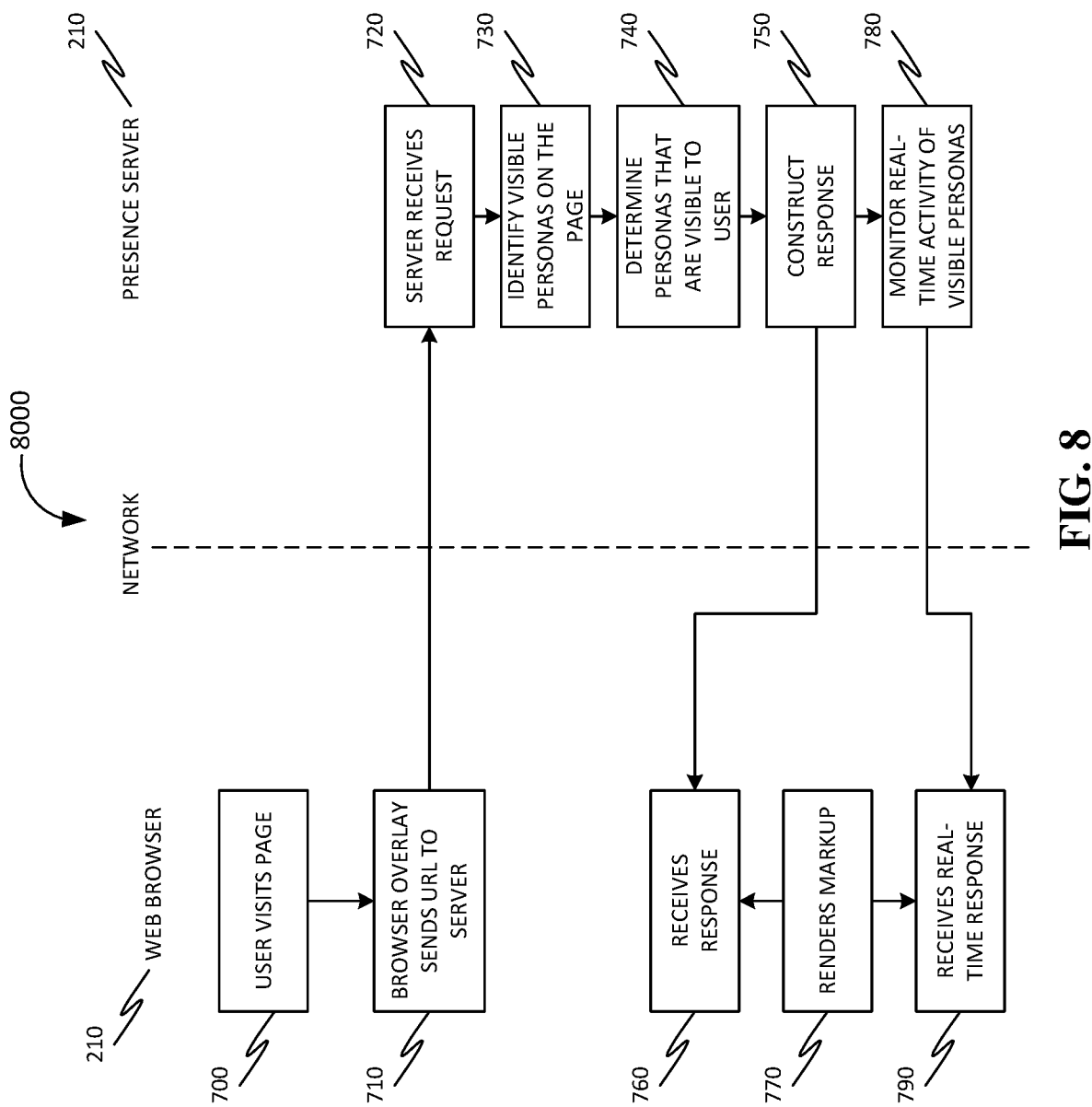
FIG. 8 is a flow diagram of a method illustrating a sequence of activities and interactions between the Presence Server and the web browser, in accordance with some embodiments.

The sequence of activities and interactions between the Presence Server 200 and the web browser 210 is shown in FIG. 8. A User visits a third-party webpage 700. The Browser overlay 215 sends URL to the server 710. The Presence Server 200 receives requests 720, The Presence Server 200 Identifies visible personas on the page 730. The Presence Server 200 Determine personas that are visible to user 740. The Presence Server 200 constructs the response 750. The Web Browser Receives response 760 and renders the markup 770. The Presence Server 200 establishes a real-time connection with Web Browser and monitors the real-time activity of visible personas 780. The Web browser receives real-time response 790 and renders the markup 770.

On-Page presence may also be done with an SDK. The SDK Configuration screen 800 enables the user to input the website URL field 810, select which pages to include/exclude in the canopi with a widget 820, and specify the personalized message 830 to display for the visitor. SDK holders may block users from using Canopi on their site. The Confirmation screen 840 displays the values for the URL 850, the pages to include or exclude 860, the personalized message 870, and the javascript snippet 880 the SDK holder needs to install on their website. The user may click the confirmation button 890.

The Canopi entry modal 900 displays when a visitor comes to a page with the canopi activated. If the visitor clicks the Yes Button 910 it opens the Canopi SDK sidebar 1100 with the Minimalized listings of visible people 1120. If the visitor clicks the No Button 920, it displays the Collapsed Canopi entry modal 1000.

If a visitor clicks the Collapsed Canopi entry modal 1000, it opens the Canopi entry modal 900. The Canopi SDK sidebar 1100 displays a list of Minimalized listings of a visible people 1120. If the visitor clicks the More button 1130 or Go Visible button 1140, it asks them to sign in or sign up, after which it displays the list of the Full listings of visible people 1200.

For each full listing of a visible person 1200, it shows their time on the site 1210, a Friend request button 1230, and a Chat request button 1240. It also shows the number of visible people on the page 1220. The ellipses display a drop-down with the options to flag and block 1250.

In the Canopi, there is the sequence of Canopi messages 1300 with other users' messages 1310 on the left. For each message, there is Upvote and downvote 1320, Reply icon 1330, Flag icon 1340, Delete icon 1350, Pin icon 1360, and Info icon 1370 which shows time and page of message. The user's messages 1380 are on the right side. There is a Search button that expands to search term input field 1390 for searching messages. Further, in some embodiments, the messages to the canopi and potentially other information may be stored in a distributed ledger (blockchain). Further, the messages and the information may be encrypted using a user's private key so that the user has to authorize any use of the messages and the information, and also the user may choose to prevent the messages and the information from being tracked.

Clicking Rooms displays the Friends list 1400, the option to create a new group 1410 and the list of friends recently chatted with 1420. The Search field 1430 enables the user to search the messages and people. Further, clicking Rooms opens the chats 1500. For each chat, it shows the Number of messages 1510 in the exchange and the Last message with a user 1520. Further, clicking the chats 1500 opens the exchange. The other user's messages 1600 are on the left. The user 1520 may add a user to create group 1610. Each message has Reply icon 1620, Flag icon 1630, Delete icon 1640, Pin icon 1650, and Info icon 1660. The user's messages 1670 are displayed on the right. The Search button expands to search field 1680 for the messages with the other user.

Further, the SDK-based Canopis and Presence Overlay may be compatible such that an extension user may participate in the SDK-based canopis. Presence users may access Presence-enabled canopis on any website. Also, an SDK Canopi could offer a search and linking capability that would enable users to experience canopis on any site without installing a browser extension.

In certain applications, in addition to the Canopi 1300, there may be breakouts or rooms that stay with the page and maybe public or by invite only. There also may be the option for the user to display all messages from all the page level canopis 1300 on the site.

In certain applications, the user may anchor a message to a content snippet on the page, by selecting the content snippet and selecting to post an anchored message.

In certain applications, the SDK holder may change the color palette used to display the Canopi entry modal 900, the Collapsed Canopi entry modal 1000, and the Canopi SDK sidebar 1100.

In certain applications, the users can initiate posts to the Canopi or private chat from pieces of content, for example, a piece of text, part of an image, or segment of video or audio. In this case, an information icon on the message would change the web page as appropriate and highlight the piece of content.

In certain applications, the SDK holder may get credit for people that signup with Presence or download the Presence extension based on interactions on their site.

In certain applications, the Canopi SDK sidebar 1100 may be expanded to overlay the entire page or be broken up into multiple modals.

In certain applications, the SDK holder may have the ability to anchor a specifically designated overlay section to a corresponding content snippet, file, or object on their site.

In certain applications, users may be able to flag pages that give errors, then the system may look for pages that have these attributes and prevent SDK holders from trying to deploy canopis on pages like these or for people using the Presence overlay to try to use it.

In certain applications, SDK holders may have the ability to assign specific hardware and Internet of Things (IoT) devices and or systems to certain overlay sections of their website.

In certain applications, users and/or SDK holders may be able to know how many people are on different canopis on a site or in the entire system of canopis or Presence overlay enabled chats. Users may also be able to see the % of people with access to Canopis who are visible on a page, site, or in the entire system.

In certain applications, SDK-based or Presence-enabled Canopis may be private to a specific group of users.

In certain applications, SDK holders may have the ability to require the authentication of users who visit the Canopi of their website.

In certain applications for both SDK-based or Presence-enabled Canopis, users may also set a visibility time period (e.g., now, today, yesterday, last week, last month) and see an overview of who's online for the selected time period. This overview could be the total # of friends, people in my groups, or the public who are visible on the page for the selected time period. Clicking through on a number on the overview displays a modal for who's online. They may also set the time frame for which they want people to be able to see their past presence.

Further, in some embodiments, a user may go live on a page and specify the topic of the live session, the rectangular location on the page where the session starts, whether audio or video, whether attendees are visible, muted, if they may unmute themselves, and if users give them control. Users invite specific visible persons, groups, or the public to join the live session. The live icon appears in lists and the live user's profile. Clicking through on the live icon brings the user to the live session with the live user on video or audio in the location specified. If attendees are visible, they fall into a grid pattern below the live user. The live user may control the page the user is on. Tours may be configured for complete control or just on transitions. The live user or admin for the live session may unmute users. When going live, the live user may move the location of the overlay on the page. Others may or may not be able to move the location of the overlay on the page. Based on the new location, the configuration of the video or audio feeds will adjust to fit the new location. Live sessions may be scheduled are available on the user's profile.

SDK holders may register an event on their page. Users of a browser extension that enables Canopi may register an event on any page for users of the browser extension. Users may view, search, and filter a list of events. Users may share an event. The event may have a countdown and a pre-registration with reminder notifications, messages, and/or emails for when the event will or is starting. The event could have an end time as well as a grace period after the end time for people to finish up conversations.

In certain applications, SDK holders may direct users to an event occurring within the Canopi overlay of their site using a QR Code or other unique identifiers.

In certain applications, users may share that they are visible on a page.

In certain applications, users may be able to experience on-page presence when a website has a three-dimensional or holographic representation of itself.

In certain applications, user may be able to experience on-page presence as avatars or 3D characters that can move about and shift perspectives on webpages with specific keys (e.g., arrow keys) and navigate to/from Metaverse worlds.

In certain applications, there are subscription options for SDK holders and alerts to SDK holders when they reach their subscription maximum number of people with an option to upgrade.

The Canopi functionality could also be made available via WordPress, Drupal, Shopify, and/or other platform plugins.

Further, in some embodiments, there may be language monitoring for the SDK holders to assist the SDK holder in understanding what canopi is being used for. The monitoring could be done as an opt-in or part of the general terms.

In certain applications, users who participate in on-page presence earn rewards based on the value their contributions make to the system.

FIG. 1 is a schematic of a system 1000 illustrating users interacting visibly or invisibly using a webpage inside a novel social layer enabled by the disclosed system 1000, in accordance with some embodiments.

FIG. 2 is a schematic of a system 2000 for enabling user interaction, in accordance with some embodiments.

FIG. 3 is a block diagram of the Presence Server 200 of the disclosed system 2000, in accordance with some embodiments.

FIG. 4 is a screenshot of a user interface 4000 showing visibility layer on the web in the browser with filterable functionality, in accordance with some embodiments, FIG. 5 is a screenshot of a user interface 5000 facilitating viewing of the visible users and enabling filtering functionality to narrow to a certain list, in accordance with some embodiments.

FIG. 6 is a screenshot of a user interface 6000 facilitating a functionality that enables hosting or scheduling a live session on a webpage, in accordance with some embodiments.

FIG. 7 is a screenshot of a user interface 7000 facilitating allowing users to markup and annotate pages inside the confines of the original webpage and outside of the original frame of the webpage, in accordance with some embodiments.

FIG. 8 is a flow diagram of a method 8000 illustrating a sequence of activities and interactions between the Presence Server and the web browser, in accordance with some embodiments.

Figure 9:
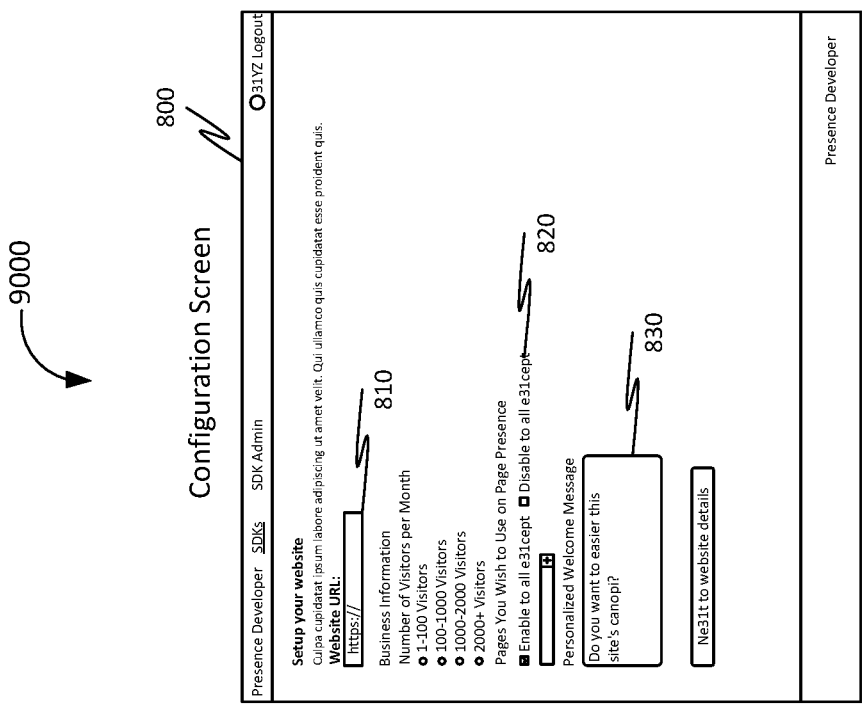
FIG. 9 is a screenshot of a user interface facilitating setting up the Canopi SDK and generating the javascript snippet, in accordance with some embodiments.

FIG. 9 is a screenshot of a user interface 9000 facilitating setting up the Canopi SDK and generating the javascript snippet, in accordance with some embodiments.

Figure 10:
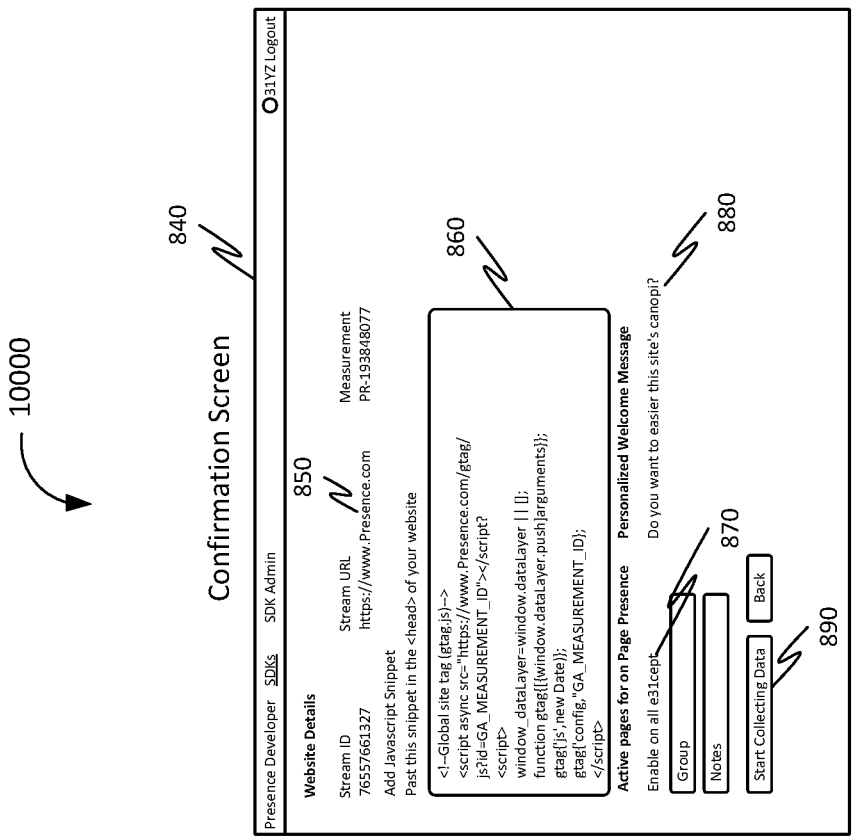
FIG. 10 is a screenshot of a user interface facilitating setting up the Canopi SDK and generating the javascript snippet, in accordance with some embodiments.

FIG. 10 is a screenshot of a user interface 10000 facilitating setting up the Canopi SDK and generating the javascript snippet, in accordance with some embodiments.

Figure 11:
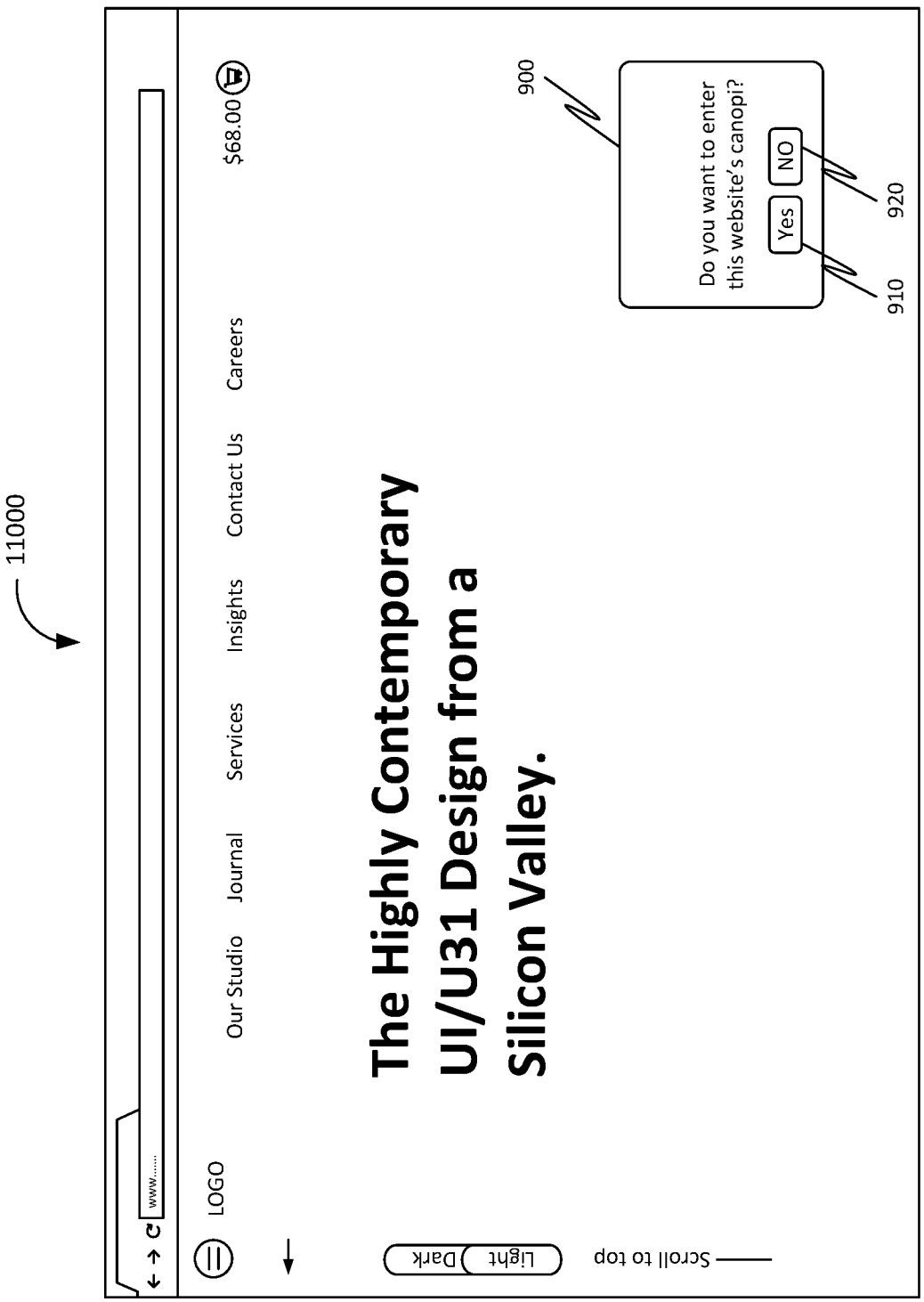
FIG. 11 is a screenshot of a user interface illustrating the invitation to enter the webpage's canopi, in accordance with some embodiments.

FIG. 11 is a screenshot of a user interface 11000 illustrating the invitation to enter the webpage's canopi, in accordance with some embodiments.

Figure 12:
FIG. 12 is a screenshot of a user interface illustrating the collapsed invitation to enter the webpage's canopi, in accordance with some embodiments.

FIG. 12 is a screenshot of a user interface 12000 illustrating the collapsed invitation to enter the webpage's canopi, in accordance with some embodiments.

FIG. 13 is a screenshot of a user interface 13000 facilitating allowing the user to see minimal profiles of people in the canopi, in accordance with some embodiments.

Figure 14:
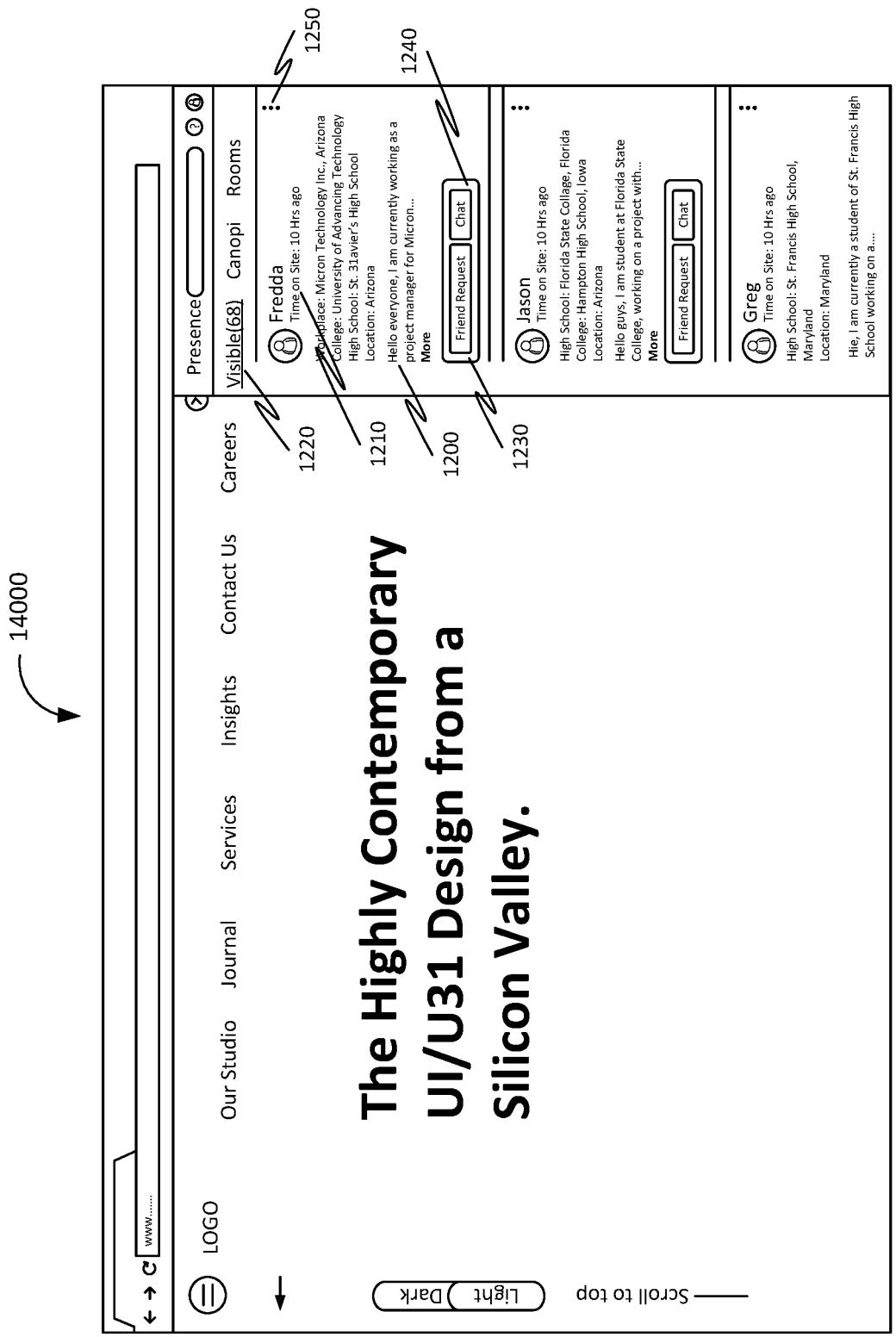
FIG. 14 is a screenshot of a user interface facilitating allowing the user to see profile & interact with visible users, in accordance with some embodiments.

FIG. 14 is a screenshot of a user interface 14000 facilitating allowing the user to see profile & interact with visible users, in accordance with some embodiments.

Figure 15:
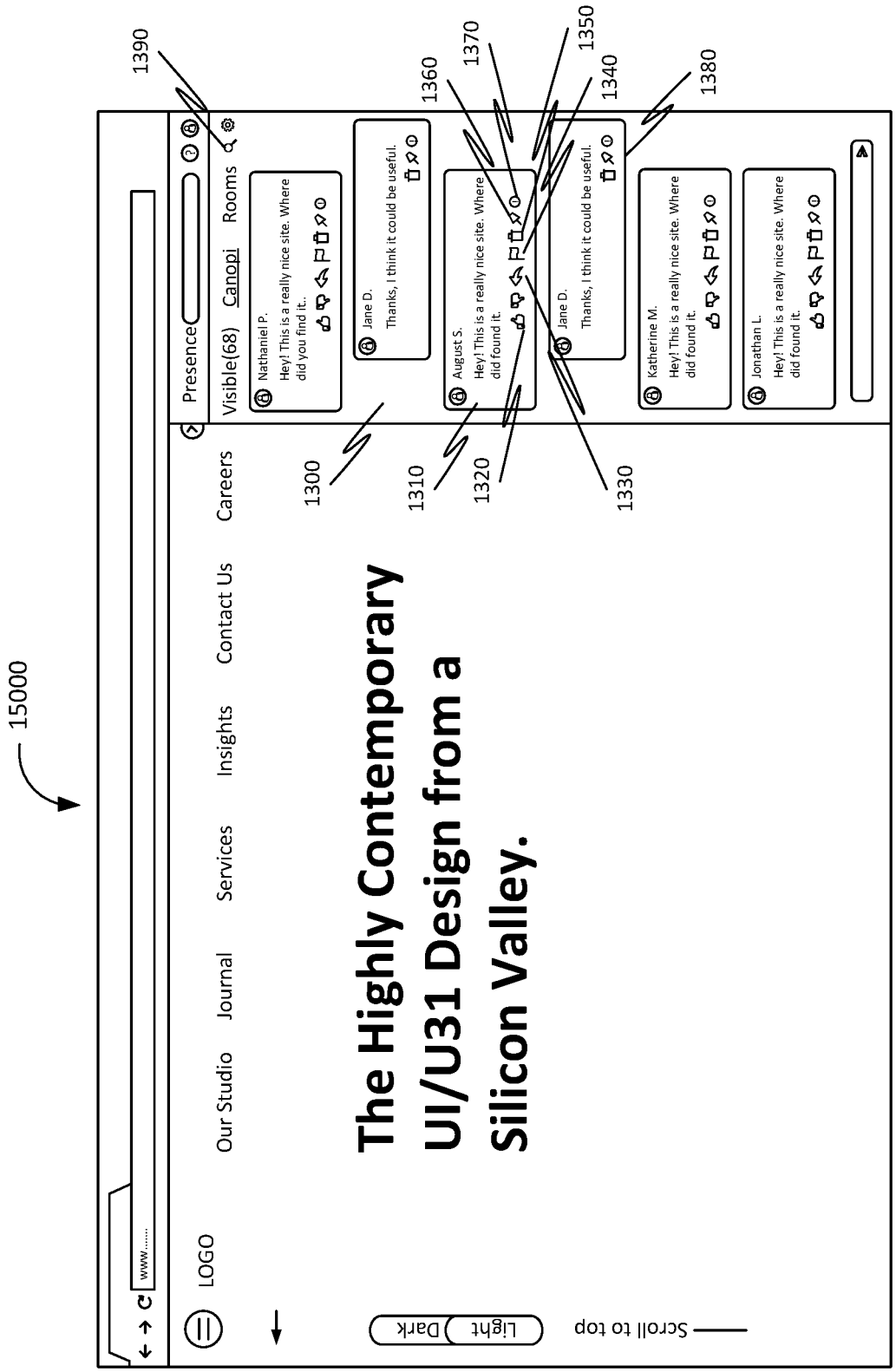
FIG. 15 is a screenshot of a user interface facilitating allowing the user to participate in a group chat, in accordance with some embodiments.

FIG. 15 is a screenshot of a user interface 15000 facilitating allowing the user to participate in a group chat, in accordance with some embodiments.

Figure 16:
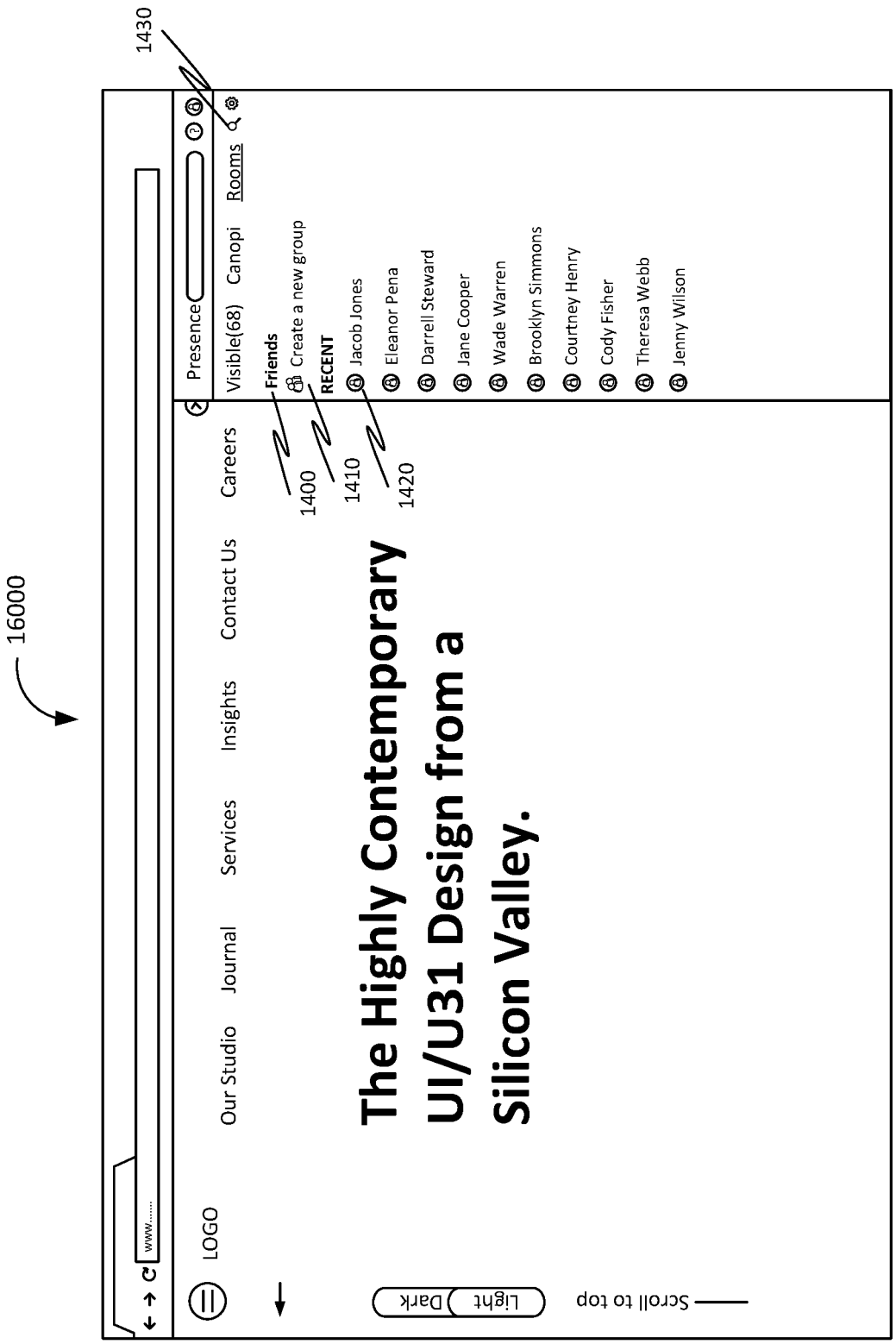
FIG. 16 is a screenshot of a user interface facilitating enabling the user to initiate an individual or group chat, in accordance with some embodiments.

FIG. 16 is a screenshot of a user interface 16000 facilitating enabling the user to initiate an individual or group chat, in accordance with some embodiments.

Figure 17:
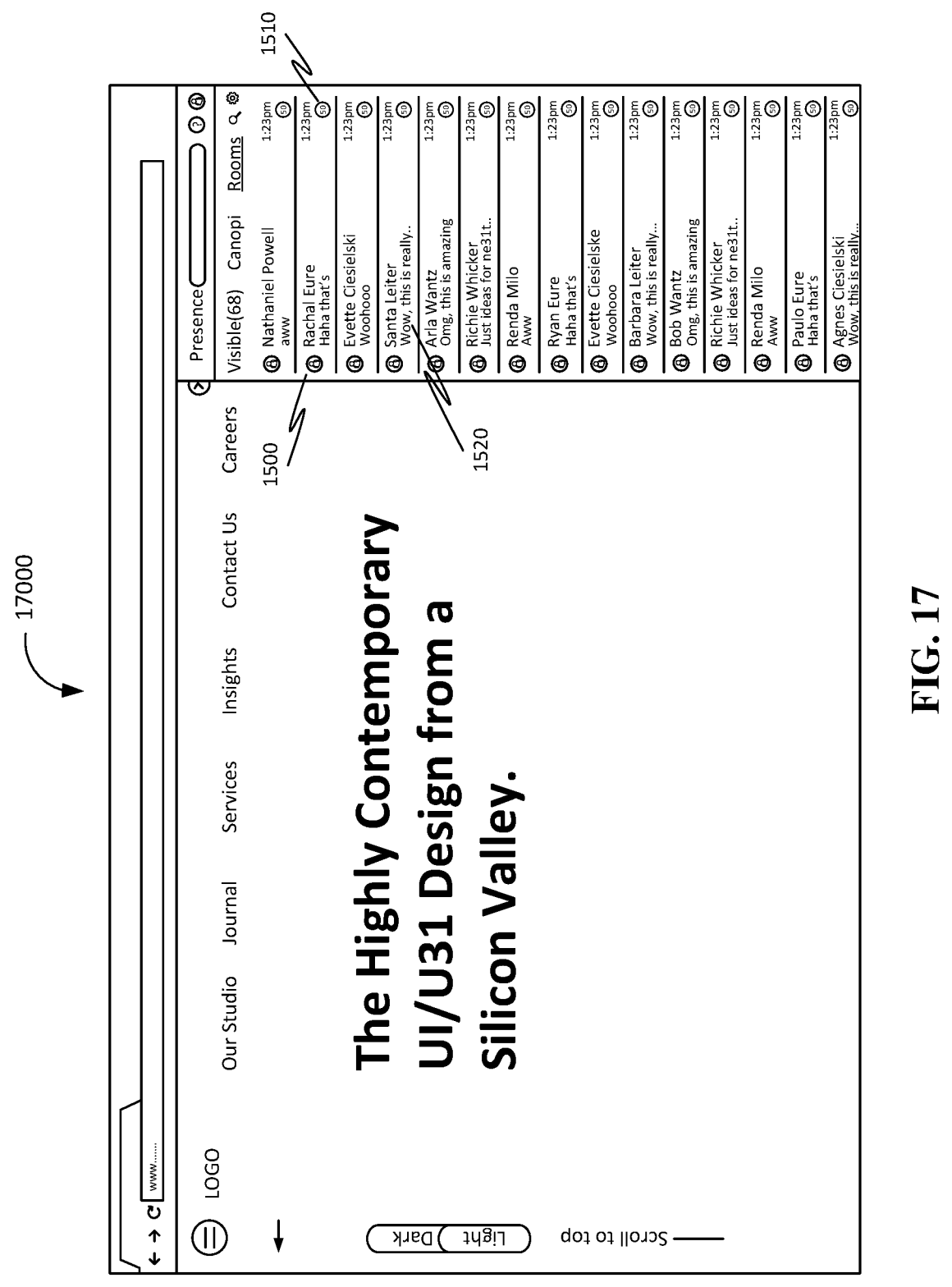

FIG. 17 is a screenshot of a user interface 17000 facilitating enabling the user to open most recent chats, in accordance with some embodiments.

Figure 18:
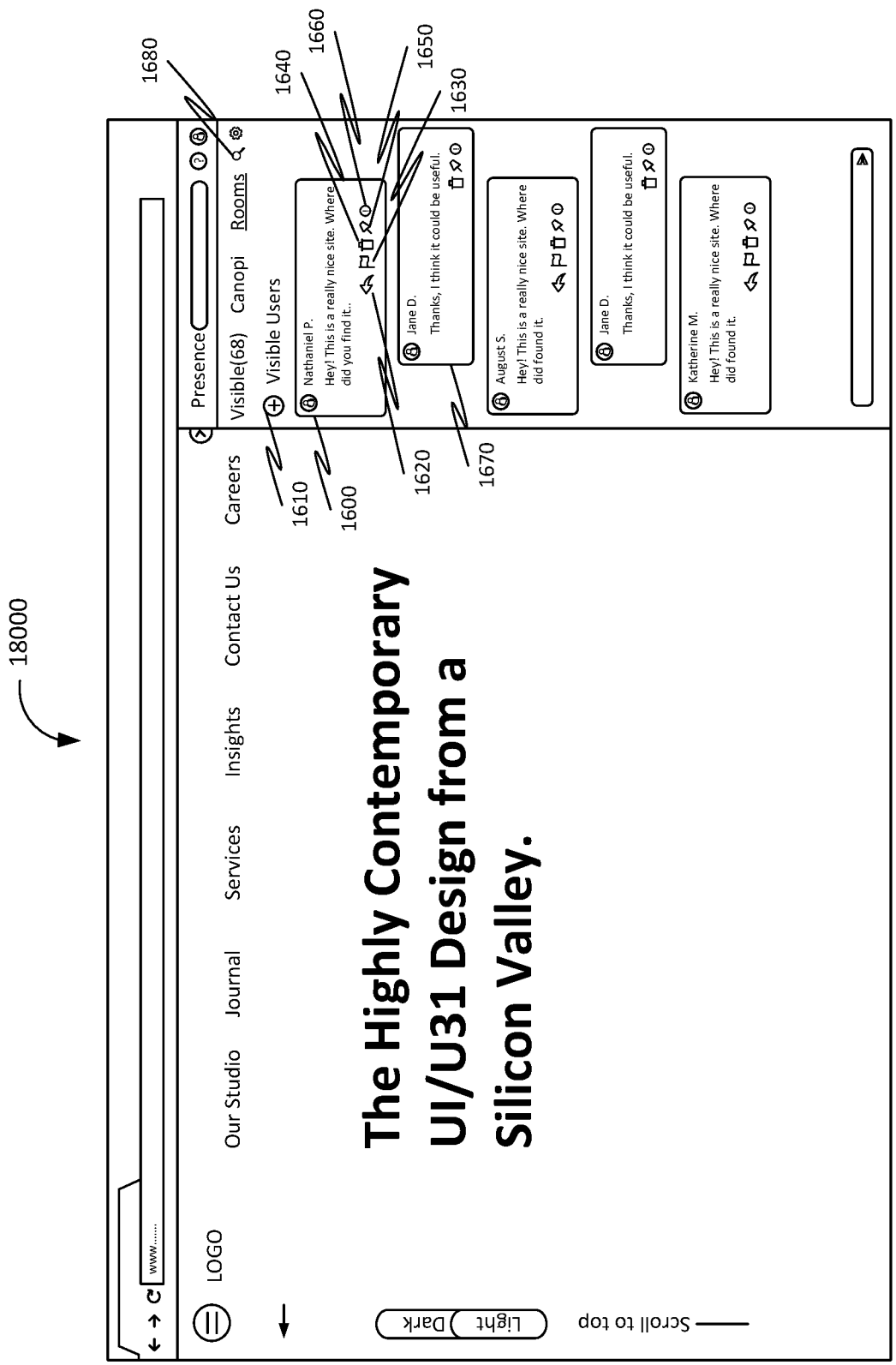
FIG. 18 is a screenshot of a user interface facilitating enabling the user to chat with another user, in accordance with some embodiments.

FIG. 18 is a screenshot of a user interface 18000 facilitating enabling the user to chat with another user, in accordance with some embodiments.

Figure 19:
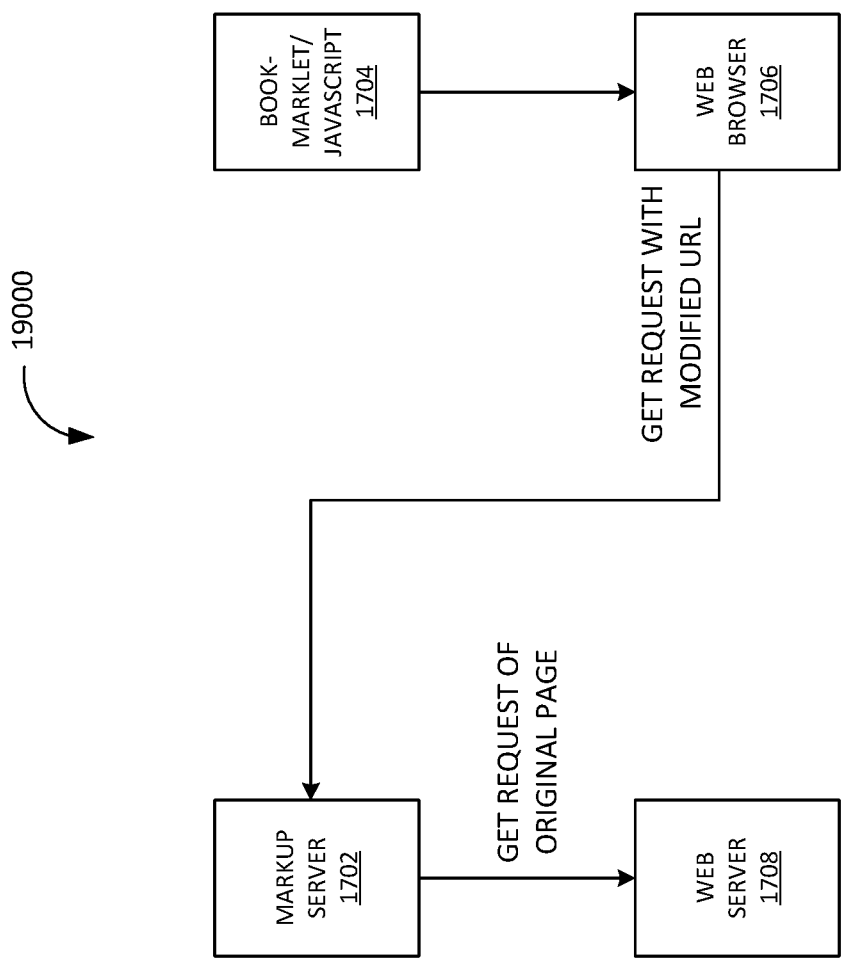
FIG. 19 is a schematic of a system enabling user interaction, in accordance with some embodiments.

FIG. 19 is a schematic of a system 19000 enabling user interaction, in accordance with some embodiments. Further, the system 19000 may include a markup server 1702, a web server 1708, a bookmarklet/javascript 1704, and a web browser 1706. Further, the bookmarklet modifies links associated with the web browser 1706. Further, the markup server 1702 may get requests with modified URLs from the web browser 1706. Further, the web server 1708 gets requests of an original page from the markup server 1704.

Figure 20:
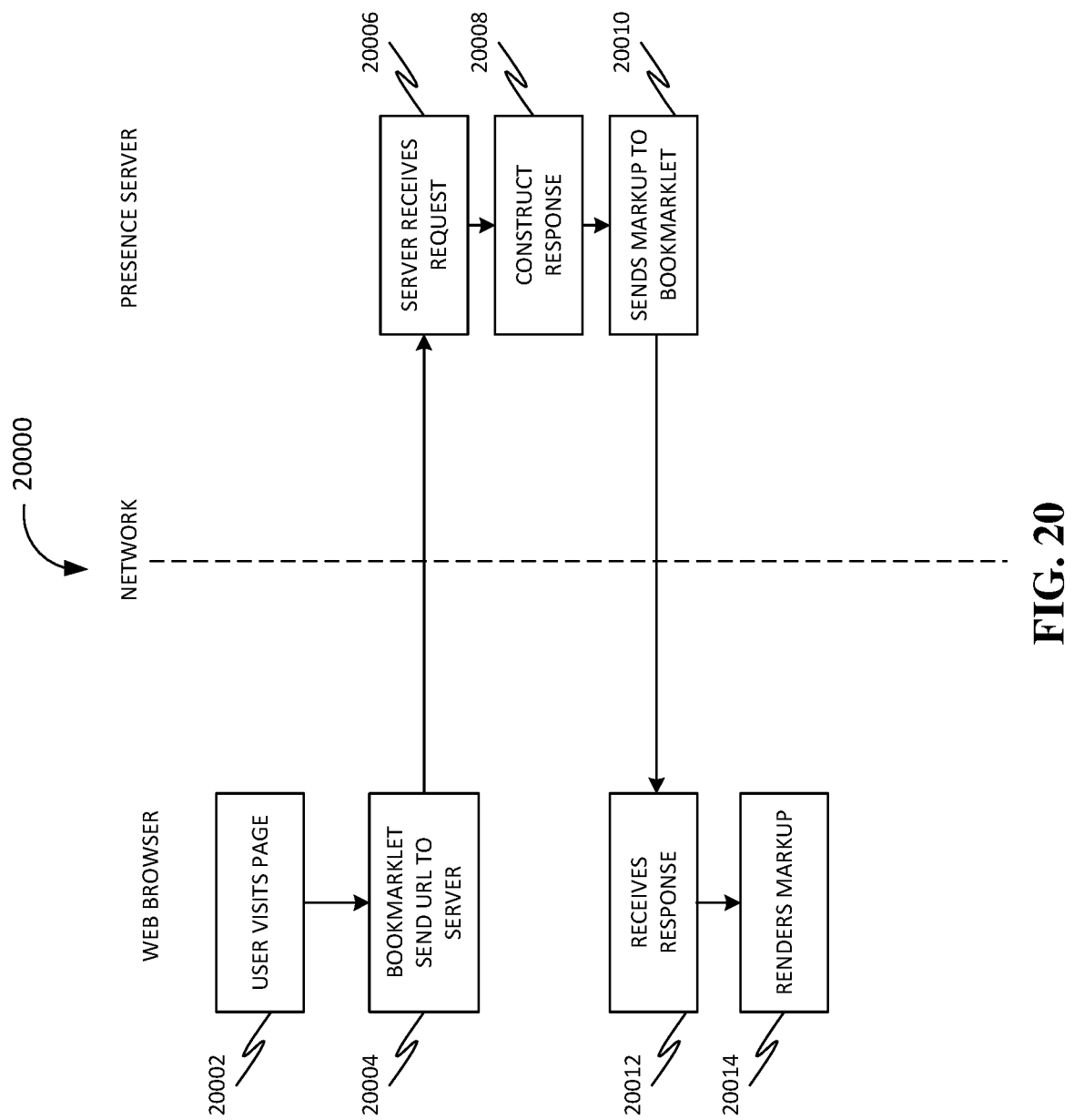
FIG. 20 is a flow chart of a method enabling user interaction, in accordance with some embodiments.

FIG. 20 is a flow chart of a method 20000 enabling user interaction, in accordance with some embodiments. Further, at 20002, the method 20000 may include a user visiting a page. Further, at 20004, the method 20000 may include a bookmarklet sending URLs to a server. Further, at 20006, the method 20000 may include the server receiving a request. Further, at 20008, the method 20000 may include the server constructing a response. Further, at 20010, the method 20000 may include the server sending a markup to the Bookmarklet. Further, at 20012, the method 20000 may include receiving the response. Further, at 20014, the method 20000 may include rendering the markup.

Figure 21:
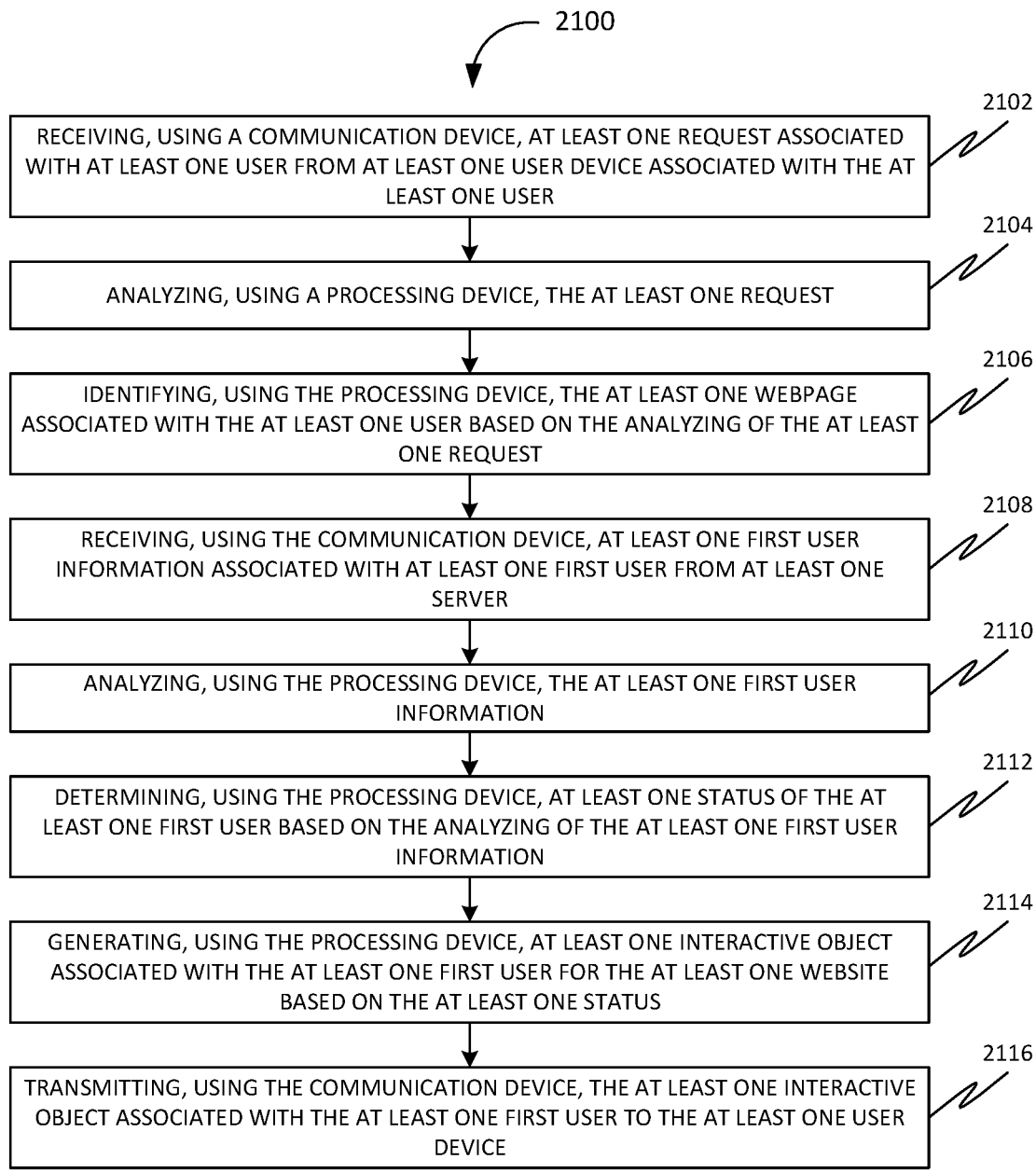
FIG. 21 is a flowchart of a method for facilitating the interaction of users on a webpage, in accordance with some embodiments.

FIG. 21 is a flowchart of a method 2100 for facilitating the interaction of users on a webpage, in accordance with some embodiments. Accordingly, at 2102, the method 2100 may include a step of receiving, using a communication device, at least one request associated with at least one user from at least one user device associated with the at least one user. Further, the at least one request may be associated with at least one webpage. Further, the at least one webpage may be displayed on the at least one user device. Further, the at least one webpage may include at least one content. Further, the at least one content may include at least one video content, at least one audio content, at least one textual content, at least one audio-video content, etc. Further, at 2104, the method 2100 may include a step of analyzing, using a processing device, the at least one request. Further, at 2106, the method 2100 may include a step of identifying, using the processing device, the at least one webpage associated with the at least one user based on the analyzing of the at least one request. Further, at 2108, the method 2100 may include a step receiving, using the communication device, at least one first user information associated with at least one first user from at least one server. Further, the at least one first user may be associated with the at least one webpage. Further, the at least one server may host at least one website associated with the at least one webpage. Further, at 2110, the method 2100 may include a step of analyzing, using the processing device, the at least one first user information. Further, at 2112, the method 2100 may include a step of determining, using the processing device, at least one status of the at least one first user based on the analyzing of the at least one first user information. Further, the at least one status may include a visibility status. Further, at 2114, the method 2100 may include a step of generating, using the processing device, at least one interactive object associated with the at least one first user for the at least one website based on the at least one status. Further, the at least one interactive object may include at least one markup. Further, the at least one interactive object may correspond to a presence of the at least one first user. Further, at 2116, the method 2100 may include a step of transmitting, using the communication device, the at least one interactive object associated with the at least one first user to the at least one user device. Further, the at least one webpage may display the at least one interactive object of the at least one first user. Further, the at least one user may interact with the at least one first user using the at least one interactive object.

Figure 22:
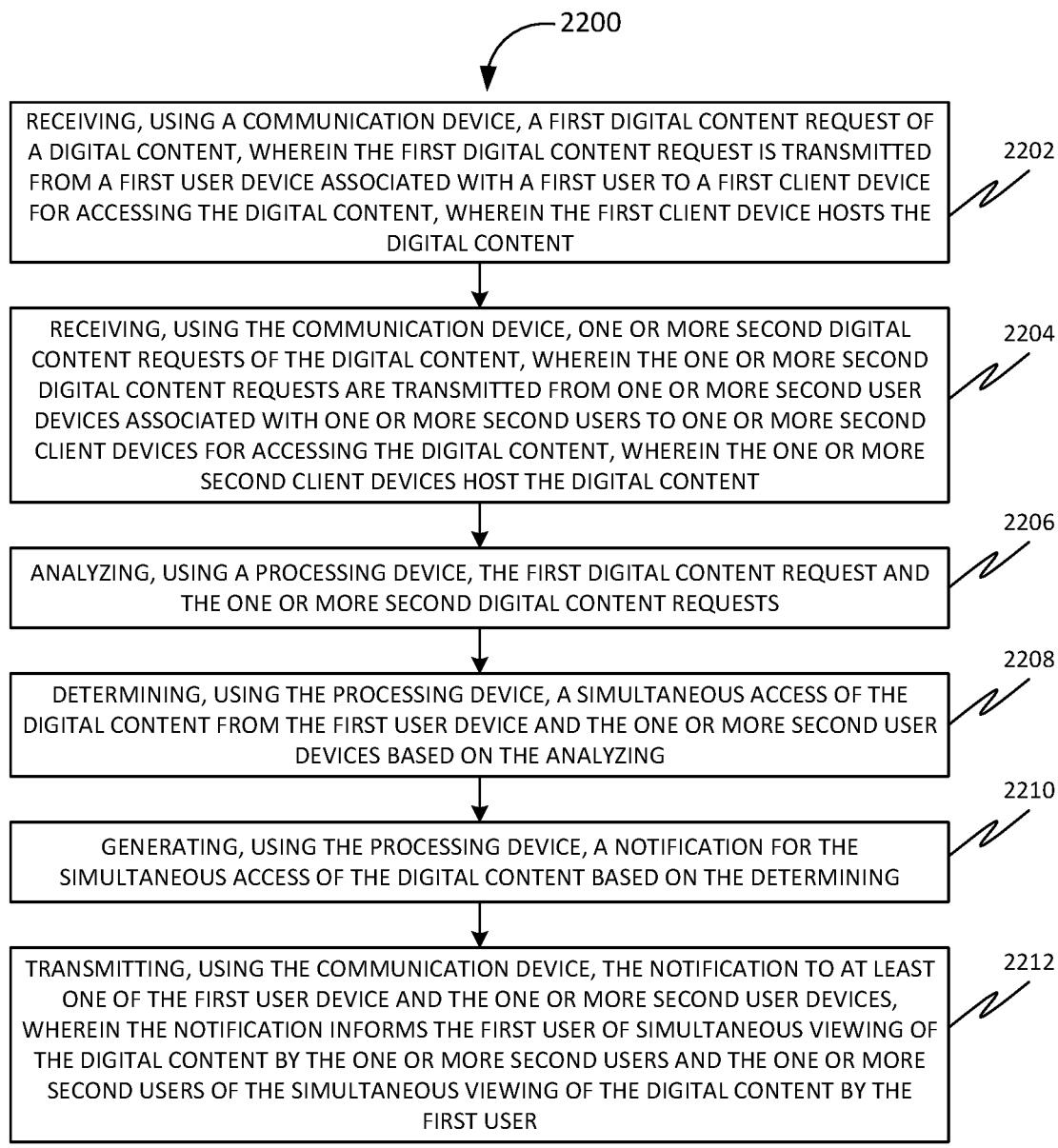
FIG. 22 is a flow chart of a method for facilitating interaction between users viewing same digital contents, in accordance with some embodiments.

FIG. 22 is a flow chart of a method 2200 for facilitating interaction between users viewing same digital contents, in accordance with some embodiments. Further, the digital contents may be associated with addresses. Further, the addresses may include identifiers of the digital contents of one or more of a web, a metaverse, a virtual reality, a mixed reality, and a spatial web. Further, the web may include the world wide web. Further, the digital contents may be associated with one or more addressable locations within one or more of the web, the metaverse, the virtual reality, the mixed reality, and the spatial web. Further, the digital contents may include virtual locations in one or more of the web, the metaverse, the virtual reality, the mixed reality, and the spatial web. Further, the digital contents may include webpages. Further, the addresses may include URLs associated with the webpages. Further, the digital contents may include virtual objects of one or more of the metaverse, the virtual reality, the mixed reality, and the spatial web.

Accordingly, the method 2200 may include a step 2202 of receiving, using a communication device, a first digital content request of a digital content. Further, the digital content may be uniquely located in one or more of the web, the metaverse, the virtual reality, the mixed reality, and the spatial web using an address. Further, the address may include an identifier. Further, the digital content may be uniquely identified using the identifier. Further, the digital content may be uniquely located in one or more of a web environment of the web, a metaverse environment of the metaverse, a virtual reality environment of the virtual reality, a mixed reality environment of the mixed reality, and a spatial web environment of the spatial web using the address. Further, the digital content may include an addressable digital content. Further, the digital content may be associated with an addressable location within one or more of the web, the metaverse, the virtual reality, the mixed reality, and the spatial web. Further, the digital content may include a virtual location in one or more of the web, the metaverse, the virtual reality, the mixed reality, and the spatial web. Further, the digital content may include a webpage, a virtual object, etc. Further, the first digital content request is transmitted from a first user device associated with a first user to a first client device for accessing the digital content. Further, the first client device hosts the digital content. In some embodiments, the receiving of the first digital content request may include receiving the first digital content request from the first user device. Further, the first user device may include a first plugin configured for generating the first digital content request based on the accessing of the digital content from the first user device. Further, the receiving of the one or more second digital content requests may include receiving the one or more second digital content requests from the one or more second user devices. Further, the one or more second user devices may include one or more second plugins configured for generating the one or more second digital content requests based on the accessing of the digital content from the one or more second user devices.

Further, the method 2200 may include a step 2204 of receiving, using the communication device, one or more second digital content requests of the digital content. Further, the one or more second digital content requests are transmitted from one or more second user devices associated with one or more second users to one or more second client devices for accessing the digital content. Further, the one or more second client devices host the digital content.

Further, the method 2200 may include a step 2206 of analyzing, using a processing device, the first digital content request and the one or more second digital content requests.

Further, the method 2200 may include a step 2208 of determining, using the processing device, a simultaneous access of the digital content from the first user device and the one or more second user devices based on the analyzing.

Further, the method 2200 may include a step 2210 of generating, using the processing device, a notification for the simultaneous access of the digital content based on the determining.

Further, the method 2200 may include a step 2212 of transmitting, using the communication device, the notification to one or more of the first user device and the one or more second user devices. Further, the notification informs the first user of simultaneous viewing of the digital content by the one or more second users and the one or more second users of the simultaneous viewing of the digital content by the first user.

In some embodiments, the receiving of the first digital content request may include receiving the first digital content request from the first client device. Further, the receiving of the one or more second digital content requests may include receiving the one or more second digital content requests from the second client devices.

Figure 23:
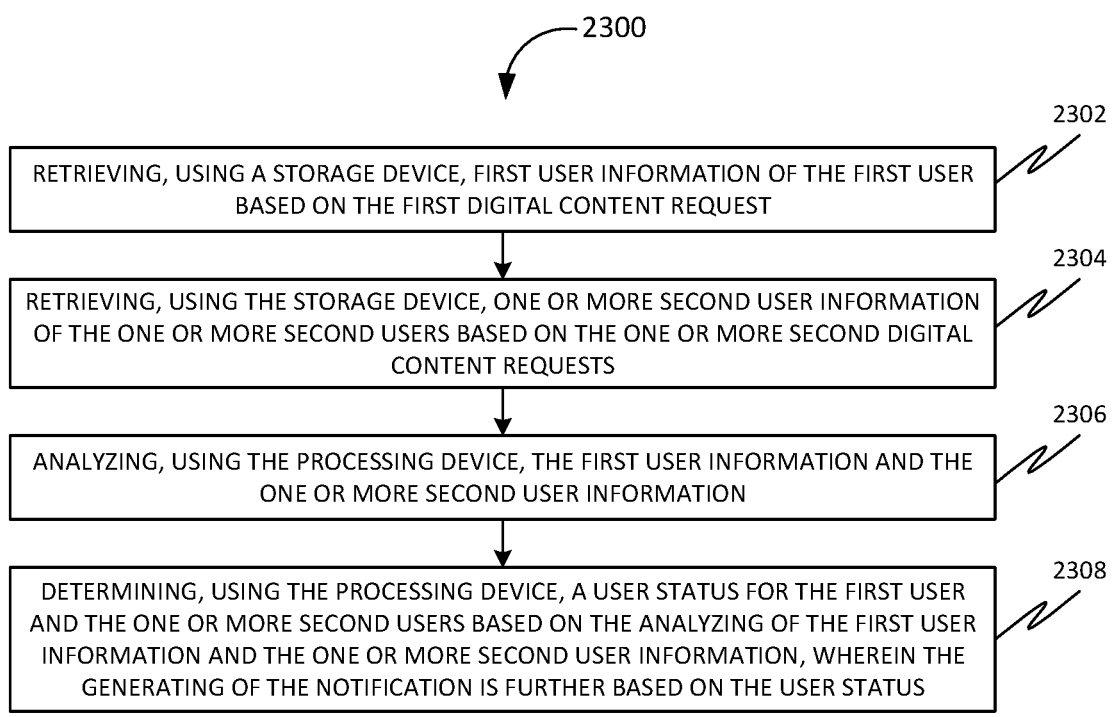
FIG. 23 is a flow chart of a method for facilitating interaction between users viewing same digital contents in which the method further may include determining a user status for the first user and the one or more second users based on the analyzing of the first user information and the one or more second user information, in accordance with some embodiments.

FIG. 23 is a flow chart of a method 2300 for facilitating interaction between users viewing same digital contents in which the method 2300 further may include determining a user status for the first user and the one or more second users based on the analyzing of the first user information and the one or more second user information, in accordance with some embodiments. Further, at 2302, the method 2300 may include retrieving, using a storage device, first user information of the first user based on the first digital content request. Further, at 2304, the method 2300 may include retrieving, using the storage device, one or more second user information of the one or more second users based on the one or more second digital content requests. Further, at 2306, the method 2300 may include analyzing, using the processing device, the first user information and the one or more second user information. Further, at 2308, the method 2300 may include determining, using the processing device, a user status for the first user and the one or more second users based on the analyzing of the first user information and the one or more second user information. Further, the user status may include a visible status and an invisible status. Further, the generating of the notification may be based on the user status.

Figure 24:
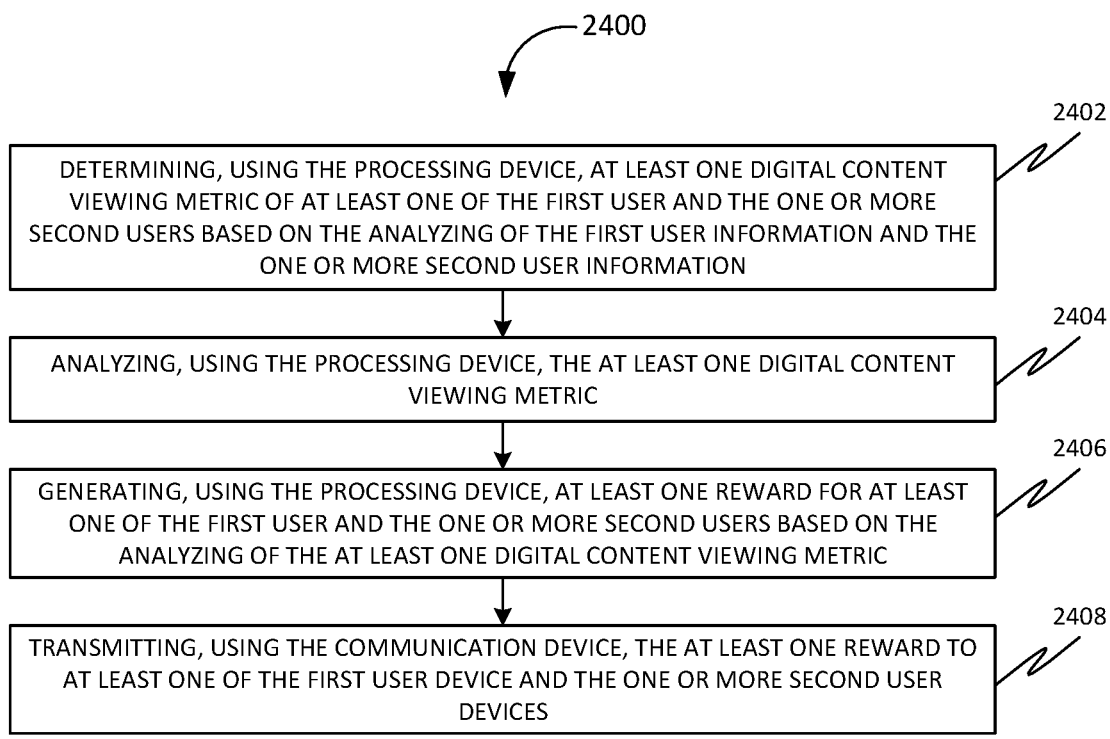
FIG. 24 is a flow chart of a method for facilitating interaction between users viewing same digital contents in which the method further may include transmitting the one or more reward to one or more of the first user device and the one or more second user devices, in accordance with some embodiments.

FIG. 24 is a flow chart of a method 2400 for facilitating interaction between users viewing same digital contents in which the method 2400 further may include transmitting the one or more reward to one or more of the first user device and the one or more second user devices, in accordance with some embodiments. Further, at 2402, the method 2400 may include determining, using the processing device, one or more digital content viewing metric of one or more of the first user and the one or more second users based on the analyzing of the first user information and the one or more second user information. Further, the one or more digital content viewing metric may include an amount of time spent by users on the digital content. Further, at 2404, the method 2400 may include analyzing, using the processing device, the one or more digital content viewing metric. Further, at 2406, the method 2400 may include generating, using the processing device, one or more rewards for one or more of the first user and the one or more second users based on the analyzing of the one or more digital content viewing metric. Further, at 2408, the method 2400 may include transmitting, using the communication device, the one or more reward to one or more of the first user device and the one or more second user devices.

Figure 25:
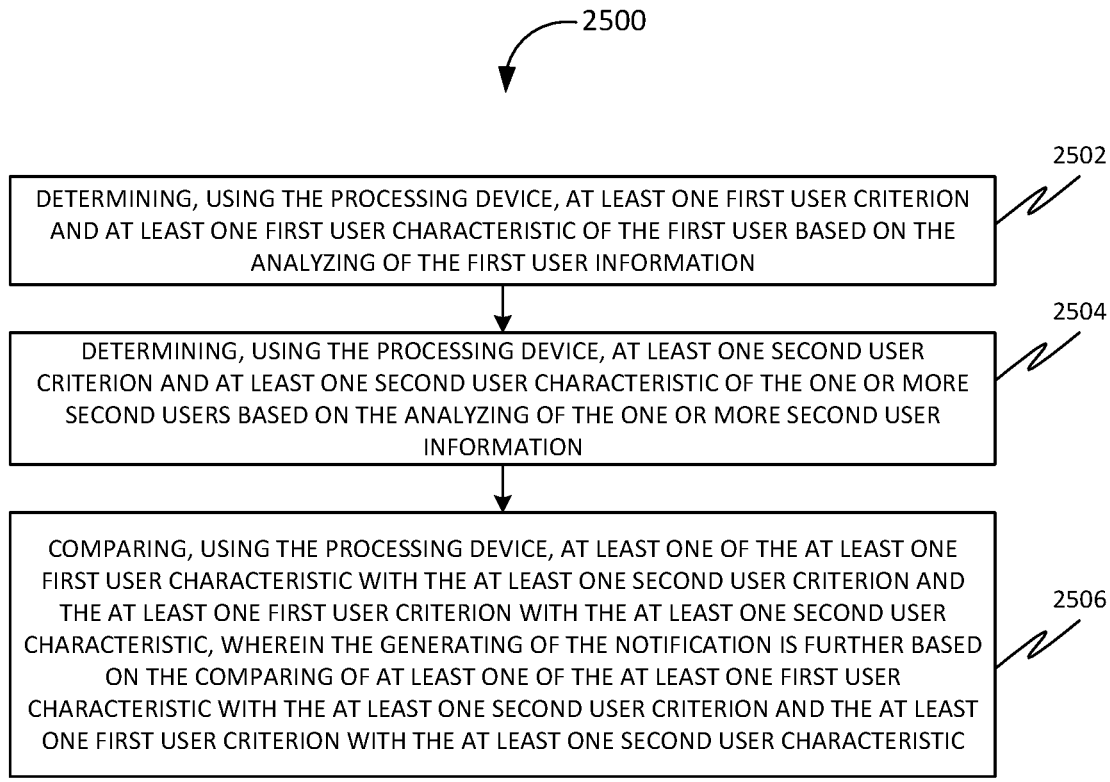
FIG. 25 is a flow chart of a method for facilitating interaction between users viewing same digital contents in which the method further may include comparing one or more of the one or more first user characteristic with the one or more second user criterion and the one or more first user criterion with the one or more second user characteristic, in accordance with some embodiments.

FIG. 25 is a flow chart of a method 2500 for facilitating interaction between users viewing same digital contents in which the method 2500 further may include comparing one or more of the one or more first user characteristic with the one or more second user criterion and the one or more first user criterion with the one or more second user characteristic, in accordance with some embodiments. Further, at 2502, the method 2500 may include determining, using the processing device, one or more first user criterion and one or more first user characteristics of the first user based on the analyzing of the first user information. Further, at 2504, the method 2500 may include determining, using the processing device, one or more second user criterion and one or more second user characteristics of the one or more second users based on the analyzing of the one or more second user information. Further, at 2506, the method 2500 may include comparing, using the processing device, one or more of the one or more first user characteristics with the one or more second user criterion and the one or more first user criterion with the one or more second user characteristic. Further, the generating of the notification may be based on the comparing of one or more of the one or more first user characteristics with the one or more second user criterion and the one or more first user criterion with the one or more second user characteristics Further, in some embodiments, the one or more first user criterion may include a first user determined proximity of the one or more second users to the first user. Further, the one or more first user characteristics may include a first proximity of the first user to the one or more second users. Further, the one or more second user criterion may include a second user determined proximity of the first user to the one or more second users. Further, the one or more second user characteristics may include a second proximity of the one or more second users to the first user. Further, the determining of the one or more first user criterion and the one or more first user characteristics may include determining the first user determined proximity and the first proximity. Further, the determining of the one or more second user criterion and the one or more second user characteristics may include determining the second user determined proximity and the second proximity. Further, the comparing of one or more of the one or more first user characteristics with the one or more second user criterion and the one or more first user criterion with the one or more second user characteristics may include comparing one or more of the first proximity with the second user determined proximity and the second proximity with the first user determined proximity. Further, the generating of the notification may be based on the comparing of one or more of the first proximity with the second user determined proximity and the second proximity with the first user determined proximity.

In some embodiments, the one or more first user criterion may include a first user determined geographical location of the one or more second users to the first user. Further, the one or more first user characteristics may include a first geographical location of the first user to the one or more second users. Further, the one or more second user criterion may include a second user determined geographical location of the first user to the one or more second users. Further, the one or more second user characteristics may include a second geographical location of the one or more second users to the first user. Further, the determining of the one or more first user criterion and the one or more first user characteristics may include determining the first user determined geographical location and the first geographical location. Further, the determining of the one or more second user criterion and the one or more second user characteristics may include determining the second user determined geographical location and the second geographical location. Further, the comparing of one or more of the one or more first user characteristics with the one or more second user criterion and the one or more first user criterion with the one or more second user characteristics may include comparing one or more of the first geographical location with the second user determined geographical location and the second geographical location with the first user determined geographical location. Further, the generating of the notification may be based on the comparing of one or more of the first geographical location with the second user determined geographical location and the second geographical location with the first user determined geographical location.

Figure 26:
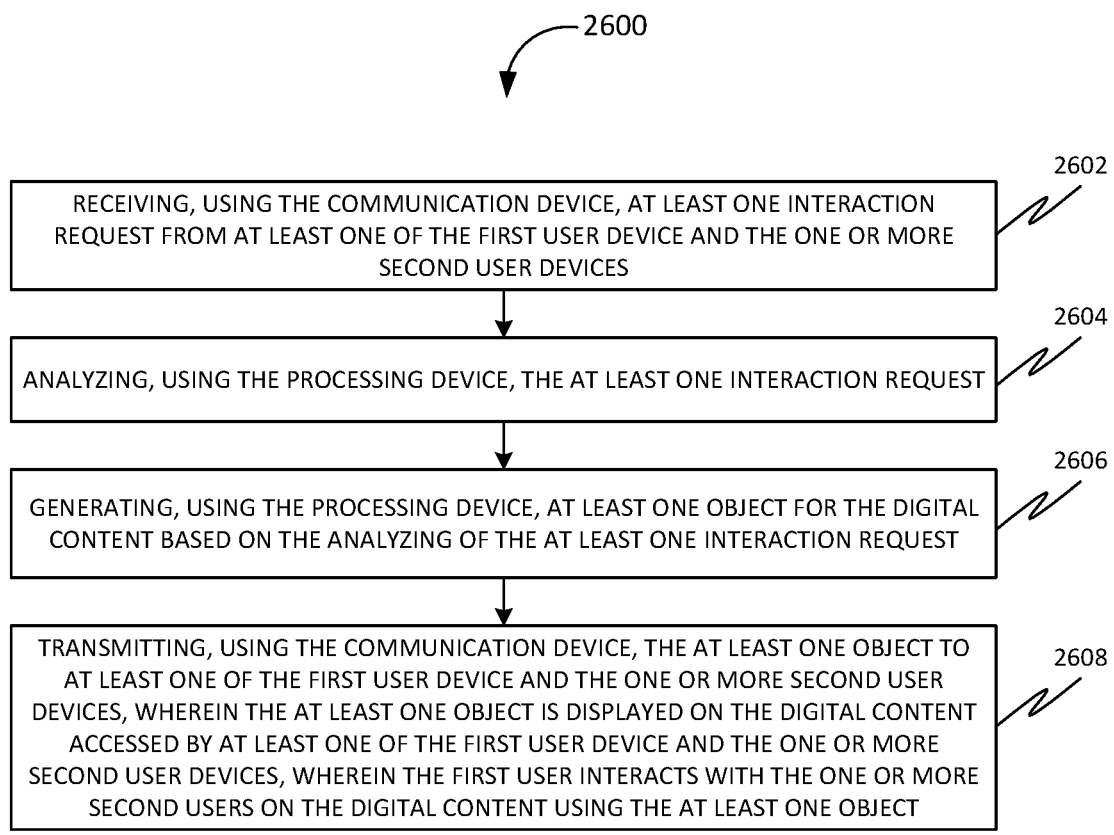
FIG. 26 is a flow chart of a method for facilitating interaction between users viewing same digital contents in which the method further may include transmitting the one or more object to one or more of the first user device and the one or more second user devices, in accordance with some embodiments.

FIG. 26 is a flow chart of a method 2600 for facilitating interaction between users viewing same digital contents in which the method 2600 further may include transmitting the one or more object to one or more of the first user device and the one or more second user devices, in accordance with some embodiments. Further, at 2602, the method 2600 may include receiving, using the communication device, one or more interaction request from one or more of the first user device and the one or more second user devices. Further, at 2604, the method 2600 may include analyzing, using the processing device, the one or more interaction request. Further, at 2606, the method 2600 may include generating, using the processing device, one or more object for the digital content based on the analyzing of the one or more interaction request. Further, the one or more object may include one or more markups, one or more chat windows, one or more active regions, one or more visual representations, one or more notes, one or more tags, one or more avatars, etc. Further, at 2608, the method 2600 may include transmitting, using the communication device, the one or more object to one or more of the first user device and the one or more second user devices. Further, the one or more object is displayed on the digital content accessed by one or more of the first user device and the one or more second user devices. Further, the first user interacts with the one or more second users on the digital content using the one or more object.

Figure 27:
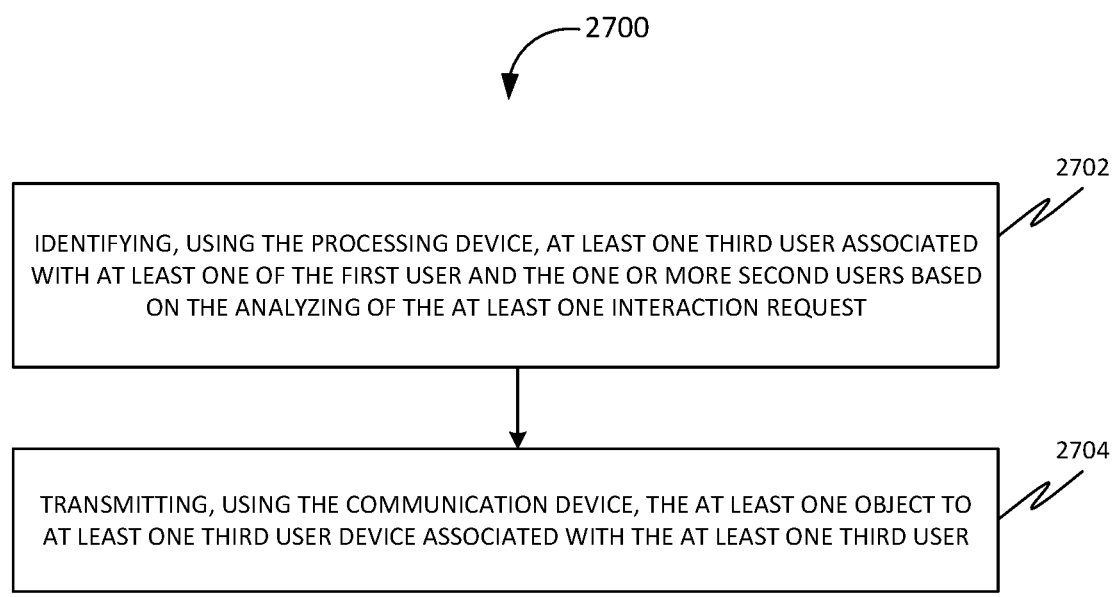
FIG. 27 is a flow chart of a method for facilitating interaction between users viewing same digital contents in which the method further may include transmitting the at least one object to at least one third user device associated with the at least one third user, in accordance with some embodiments.

FIG. 27 is a flow chart of a method 2700 for facilitating interaction between users viewing same digital contents in which the method 2700 further may include transmitting the at least one object to at least one third user device associated with the at least one third user, in accordance with some embodiments. Further, at 2702, the method 2700 may include identifying, using the processing device, at least one third user associated with at least one of the first user and the one or more second users based on the analyzing of the at least one interaction request. Further, the at least one third user may socially follow at least one of the first user and the one or more second users. Further, at 2704, the method 2700 may include transmitting, using the communication device, the at least one object to at least one third user device associated with the at least one third user. Further, the at least one object is displayed on the digital content accessed by the at least one third user device.

Figure 28:
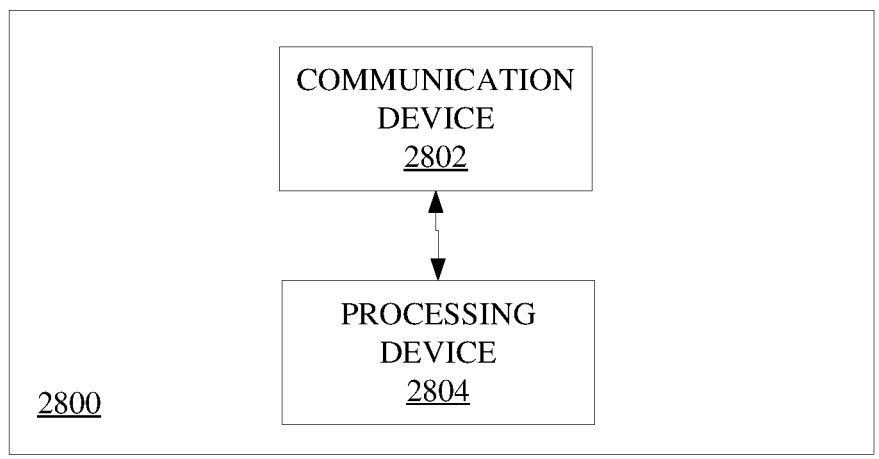
FIG. 28 is a block diagram of a system for facilitating interaction between users viewing same digital contents, in accordance with some embodiments.

FIG. 28 is a block diagram of a system 2800 for facilitating interaction between users viewing same digital contents, in accordance with some embodiments. Accordingly, the system 2800 may include a communication device 2802 configured for receiving a first digital content request of a digital content. Further, the first digital content request may be transmitted from a first user device associated with a first user to a first client device for accessing the digital content. Further, the first client device hosts the digital content. Further, the communication device 2802 may be configured for receiving one or more second digital content requests of the digital content. Further, the one or more second digital content requests are transmitted from one or more second user devices associated with one or more second users to one or more second client devices for accessing the digital content. Further, the one or more second client devices host the digital content. Further, the communication device 2802 may be configured for transmitting a notification to at least one of the first user device and the one or more second user devices. Further, the notification informs the first user of simultaneous viewing of the digital content by the one or more second users and the one or more second users of the simultaneous viewing of the digital content by the first user.

Further, the system 2800 may include a processing device 2804 communicatively coupled with the communication device 2802. Further, the processing device 2804 may be configured for analyzing the first digital content request and the one or more second digital content requests. Further, the processing device 2804 may be configured for determining a simultaneous access of the digital content from the first user device and the one or more second user devices based on the analyzing. Further, the processing device 2804 may be configured for generating the notification for the simultaneous access of the digital content based on the determining, Further, in some embodiments, the receiving of the first digital content request may include receiving the first digital content request from the first user device. Further, the first user device may include a first plugin configured for generating the first digital content request based on the accessing of the digital content from the first user device. Further, the receiving of the one or more second digital content requests may include receiving the one or more second digital content requests from the one or more second user devices. Further, the one or more second user devices may include one or more second plugins configured for generating the one or more second digital content requests based on the accessing of the digital content from the one or more second user devices.

Further, in some embodiments, the receiving of the first digital content request may include receiving the first digital content request from the first client device. Further, the receiving of the one or more second digital content requests may include receiving the one or more second digital content requests from the second client devices.

Figure 29:
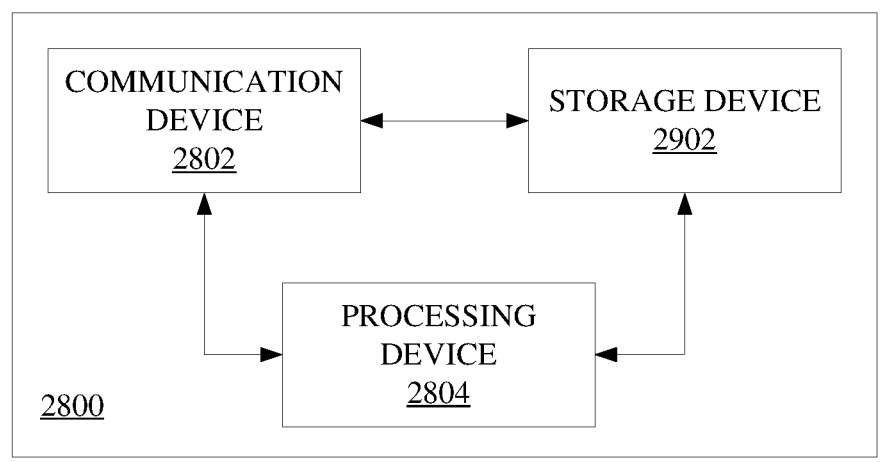
FIG. 29 is a block diagram of the system for facilitating interaction between users viewing same digital contents, in accordance with some embodiments.

In further embodiments, the system 2800 may include a storage device 2902 (as shown in FIG. 29) communicatively coupled with the communication device 2802 and the processing device 2804. Further, the storage device 2902 may be configured for retrieving first user information of the first user based on the first digital content request. Further, the storage device 2902 may be configured for retrieving one or more second user information of the one or more second users based on the one or more second digital content requests. Further, the processing device 2804 may be configured for analyzing the first user information and the one or more second user information. Further, the processing device 2804 may be configured for determining a user status for the first user and the one or more second users based on the analyzing of the first user information and the one or more second user information. Further, the generating of the notification may be based on the user status.

Further, in some embodiments, the processing device 2804 may be configured for determining at least one digital content viewing metric of at least one of the first user and the one or more second users based on the analyzing of the first user information and the one or more second user information. Further, the processing device 2804 may be configured for analyzing the at least one digital content viewing metric. Further, the processing device 2804 may be configured for generating at least one reward for at least one of the first user and the one or more second users based on the analyzing of the at least one digital content viewing metric. Further, the communication device 2802 may be configured for transmitting the at least one reward to at least one of the first user device and the one or more second user devices.

Further, in some embodiments, the processing device 2804 may be configured for determining at least one first user criterion and at least one first user characteristic of the first user based on the analyzing of the first user information. Further, the processing device 2804 may be configured for determining at least one second user criterion and at least one second user characteristic of the one or more second users based on the analyzing of the one or more second user information. Further, the processing device 2804 may be configured for comparing at least one of the at least one first user characteristic with the at least one second user criterion and the at least one first user criterion with the at least one second user characteristic. Further, the generating of the notification may be based on the comparing of at least one of the at least one first user characteristic with the at least one second user criterion and the at least one first user criterion with the at least one second user characteristic.

Further, in some embodiments, the at least one first user criterion may include a first user determined proximity of the one or more second users to the first user. Further, the at least one first user characteristic may include a first proximity of the first user to the one or more second users. Further, the at least one second user criterion may include a second user determined proximity of the first user to the one or more second users. Further, the at least one second user characteristic may include a second proximity of the one or more second users to the first user. Further, the determining of the at least one first user criterion and the at least one first user characteristic may include determining the first user determined proximity and the first proximity. Further, the determining of the at least one second user criterion and the at least one second user characteristic may include determining the second user determined proximity and the second proximity. Further, the comparing of at least one of the at least one first user characteristic with the at least one second user criterion and the at least one first user criterion with the at least one second user characteristic may include comparing at least one of the first proximity with the second user determined proximity and the second proximity with the first user determined proximity. Further, the generating of the notification may be based on the comparing of at least one of the first proximity with the second user determined proximity and the second proximity with the first user determined proximity.

Further, in some embodiments, the at least one first user criterion may include a first user determined geographical location of the one or more second users to the first user. Further, the at least one first user characteristic may include a first geographical location of the first user to the one or more second users. Further, the at least one second user criterion may include a second user determined geographical location of the first user to the one or more second users. Further, the at least one second user characteristic may include a second geographical location of the one or more second users to the first user. Further, the determining of the at least one first user criterion and the at least one first user characteristic may include determining the first user determined geographical location and the first geographical location. Further, the determining of the at least one second user criterion and the at least one second user characteristic may include determining the second user determined geographical location and the second geographical location. Further, the comparing of at least one of the at least one first user characteristic with the at least one second user criterion and the at least one first user criterion with the at least one second user characteristic may include comparing at least one of the first geographical location with the second user determined geographical location and the second geographical location with the first user determined geographical location. Further, the generating of the notification may be based on the comparing of at least one of the first geographical location with the second user determined geographical location and the second geographical location with the first user determined geographical location.

Further, in some embodiments, the communication device 2802 may be configured for receiving at least one interaction request from at least one of the first user device and the one or more second user devices. Further, the communication device 2802 may be configured for transmitting at least one object to at least one of the first user device and the one or more second user devices. Further, the at least one object may be displayed on the digital content accessed by at least one of the first user device and the one or more second user devices. Further, the first user interacts with the one or more second users on the digital content using the at least one object. Further, the processing device 2804 may be configured for analyzing the at least one interaction request. Further, the processing device 2804 may be configured for generating the at least one object for the digital content based on the analyzing of the at least one interaction request.

Further, in some embodiments, the processing device 2804 may be configured for identifying at least one third user associated with at least one of the first user and the one or more second users based on the analyzing of the at least one interaction request. Further, the communication device 2802 may be configured for transmitting the at least one object to at least one third user device associated with the at least one third user. Further, the at least one object may be displayed on the digital content accessed by the at least one third user device.

FIG. 29 is a block diagram of the system 2800 for facilitating interaction between users viewing same digital contents, in accordance with some embodiments.

Figure 30:
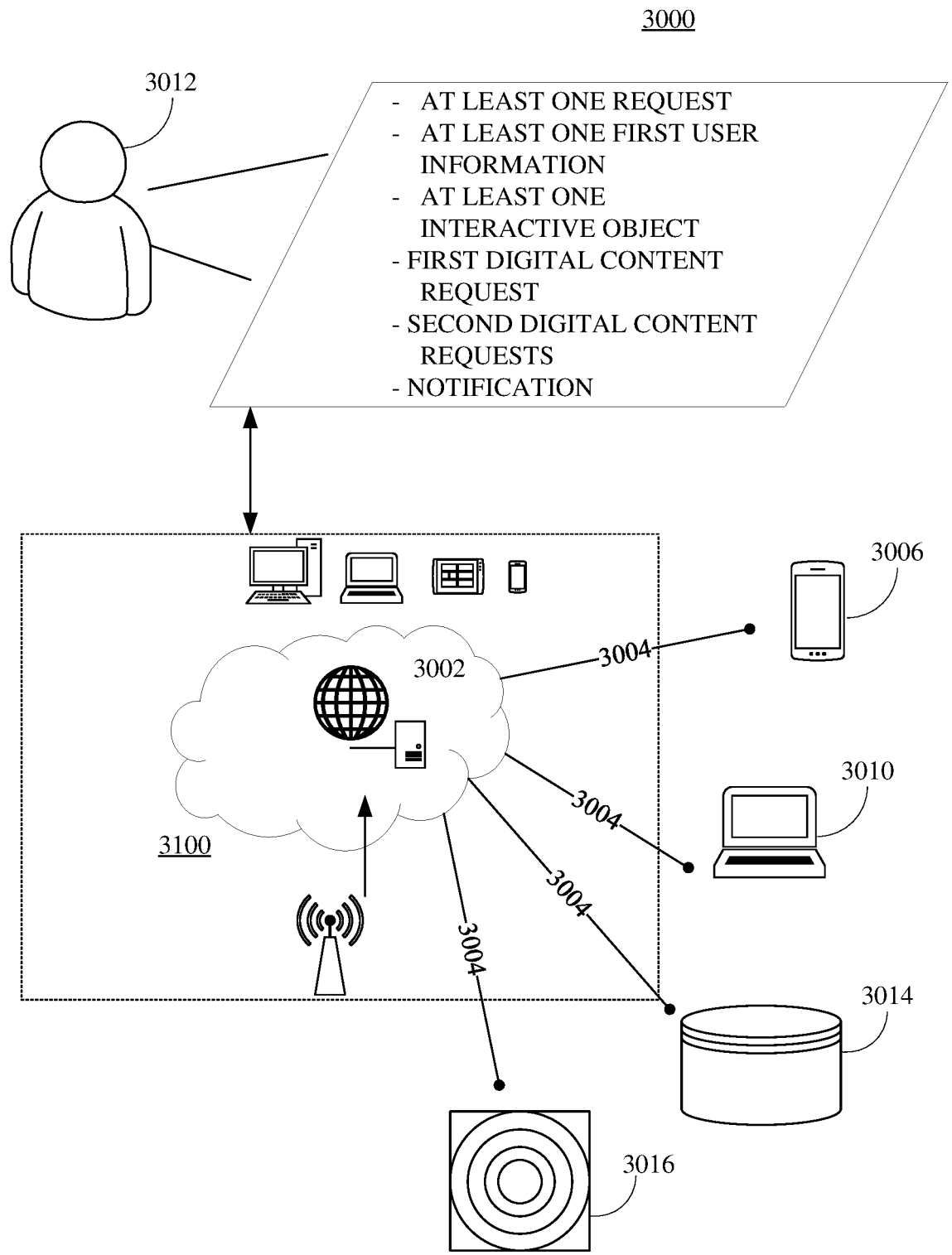
FIG. 30 is an illustration of an online platform consistent with various embodiments of the present disclosure.

FIG. 30 is an illustration of an online platform 3000 consistent with various embodiments of the present disclosure. By way of non-limiting example, the online platform 3000 to enable facilitating interaction between users viewing same webpages and virtual locations may be hosted on a centralized server 3002, such as, for example, a cloud computing service. The centralized server 3002 may communicate with other network entities, such as, for example, a mobile device 3006 (such as a smartphone, a laptop, a tablet computer, etc.), other electronic devices 3010 (such as desktop computers, server computers, etc.), databases 3014, and sensors 3016 over a communication network 3004, such as, but not limited to, the Internet. Further, users of the online platform 3000 may include relevant parties such as, but not limited to, end-users, administrators, service providers, service consumers, and so on. Accordingly, in some instances, electronic devices operated by the one or more relevant parties may be in communication with the platform.

A user 3012, such as the one or more relevant parties, may access online platform 3000 through a web based software application or browser. The web based software application may be embodied as, for example, but not be limited to, a website, a web application, a desktop application, and a mobile application compatible with a computing device 3100.

Figure 31:
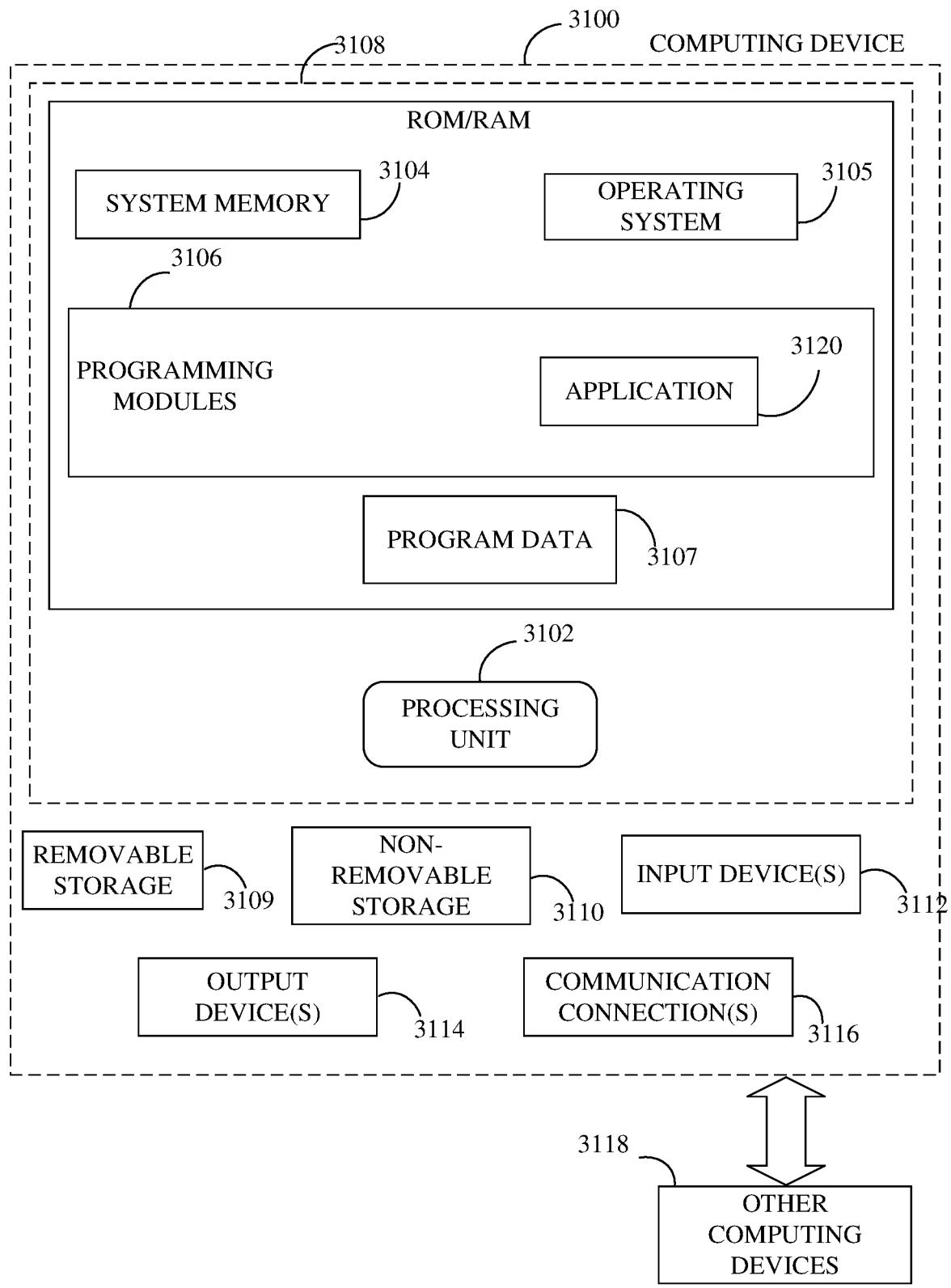
FIG. 31 is a block diagram of a computing device for implementing the methods disclosed herein, in accordance with some embodiments.

With reference to FIG. 31, a system consistent with an embodiment of the disclosure may include a computing device or cloud service, such as computing device 3100. In a basic configuration, computing device 3100 may include at least one processing unit 3102 and a system memory 3104. Depending on the configuration and type of computing device, system memory 3104 may comprise, but is not limited to, volatile (e.g. random-access memory (RAM)), non-volatile (e.g. read-only memory (ROM)), flash memory, or any combination. System memory 3104 may include operating system 3105, one or more programming modules 3106, and may include a program data 3107. Operating system 3105, for example, may be suitable for controlling computing device 3100's operation. In one embodiment, programming modules 3106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 31 by those components within a dashed line 3108.

Computing device 3100 may have additional features or functionality. For example, computing device 3100 may also include additional data storage devices (removable and/or non-removable) such as, for example, magnetic disks, optical disks, or tape. Such additional storage is illustrated in FIG. 31 by a removable storage 3109 and a non-removable storage 3110. Computer storage media may include volatile and non-volatile, removable and non-removable media implemented in any method or technology for storage of information, such as computer-readable instructions, data structures, program modules, or other data. System memory 3104, removable storage 3109, and non-removable storage 3110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3100. Any such computer storage media may be part of device 3100. Computing device 3100 may also have input device(s) 3112 such as a keyboard, a mouse, a pen, a sound input device, a touch input device, a location sensor, a camera, a biometric sensor, etc. Output device(s) 3114 such as a display, speakers, a printer, etc. may also be included. The aforementioned devices are examples and others may be used.

Computing device 3100 may also contain a communication connection 3116 that may allow device 3100 to communicate with other computing devices 3118, such as over a network in a distributed computing environment, for example, an intranet or the Internet. Communication connection 3116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3104, including operating system 3105. While executing on processing unit 3102, programming modules 3106 (e.g., application 3120 such as a media player) may perform processes including, for example, one or more stages of methods, algorithms, systems, applications, servers, databases as described above. The aforementioned process is an example, and processing unit 3102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

We claim:

1. A method for facilitating interaction between users viewing same digital contents, the method comprising:
receiving, using a communication device, a first digital content request of a digital content, wherein the first digital content request is transmitted from a first user device associated with a first user to a first client device for accessing the digital content, wherein the first client device hosts the digital content;
receiving, using the communication device, one or more second digital content requests of the digital content, wherein the one or more second digital content requests are transmitted from one or more second user devices associated with one or more second users to one or more second client devices for accessing the digital content, wherein the one or more second client devices host the digital content;
analyzing, using a processing device, the first digital content request and the one or more second digital content requests;
determining, using the processing device, a simultaneous access of the digital content from the first user device and the one or more second user devices based on the analyzing;
generating, using the processing device, a notification for the simultaneous access of the digital content based on the determining;
transmitting, using the communication device, the notification to at least one of the first user device and the one or more second user devices, wherein the notification informs the first user of simultaneous viewing of the digital content by the one or more second users and the one or more second users of the simultaneous viewing of the digital content by the first user;
retrieving, using a storage device, first user information of the first user based on the first digital content request;
retrieving, using the storage device, one or more second user information of the one or more second users based on the one or more second digital content requests;
analyzing, using the processing device, the first user information and the one or more second user information;
determining, using the processing device, a user status for the first user and the one or more second users based on the analyzing of the first user information and the one or more second user information, wherein the generating of the notification is further based on the user status;
determining, using the processing device, at least one digital content viewing metric of at least one of the first user and the one or more second users based on the analyzing of the first user information and the one or more second user information;
analyzing, using the processing device, the at least one digital content viewing metric;
generating, using the processing device, at least one reward for at least one of the first user and the one or more second users based on the analyzing of the at least one digital content viewing metric; and
transmitting, using the communication device, the at least one reward to at least one of the first user device and the one or more second user devices.

2. The method of claim 1, wherein the receiving of the first digital content request comprises receiving the first digital content request from the first user device, wherein the first user device comprises a first plugin configured for generating the first digital content request based on the accessing of the digital content from the first user device, wherein the receiving of the one or more second digital content requests comprise receiving the one or more second digital content requests from the one or more second user devices, wherein the one or more second user devices comprises one or more second plugins configured for generating the one or more second digital content requests based on the accessing of the digital content from the one or more second user devices.

3. The method of claim 1, wherein the receiving of the first digital content request comprises receiving the first digital content request from the first client device, wherein the receiving of the one or more second digital content requests comprises receiving the one or more second digital content requests from the second client devices.

4. The method of claim 1 further comprising:
determining, using the processing device, at least one first user criterion and at least one first user characteristic of the first user based on the analyzing of the first user information;
determining, using the processing device, at least one second user criterion and at least one second user characteristic of the one or more second users based on the analyzing of the one or more second user information; and
comparing, using the processing device, at least one of the at least one first user characteristic with the at least one second user criterion and the at least one first user criterion with the at least one second user characteristic, wherein the generating of the notification is further based on the comparing of at least one of the at least one first user characteristic with the at least one second user criterion and the at least one first user criterion with the at least one second user characteristic.

5. The method of claim 4, wherein the at least one first user criterion comprises a first user determined proximity of the one or more second users to the first user, wherein the at least one first user characteristic comprises a first proximity of the first user to the one or more second users, wherein the at least one second user criterion comprises a second user determined proximity of the first user to the one or more second users, wherein the at least one second user characteristic comprises a second proximity of the one or more second users to the first user, wherein the determining of the at least one first user criterion and the at least one first user characteristic comprises determining the first user determined proximity and the first proximity, wherein the determining of the at least one second user criterion and the at least one second user characteristic comprises determining the second user determined proximity and the second proximity, wherein the comparing of at least one of the at least one first user characteristic with the at least one second user criterion and the at least one first user criterion with the at least one second user characteristic comprises comparing at least one of the first proximity with the second user determined proximity and the second proximity with the first user determined proximity, wherein the generating of the notification is further based on the comparing of at least one of the first proximity with the second user determined proximity and the second proximity with the first user determined proximity.

6. The method of claim 4, wherein the at least one first user criterion comprises a first user determined geographical location of the one or more second users to the first user, wherein the at least one first user characteristic comprises a first geographical location of the first user to the one or more second users, wherein the at least one second user criterion comprises a second user determined geographical location of the first user to the one or more second users, wherein the at least one second user characteristic comprises a second geographical location of the one or more second users to the first user, wherein the determining of the at least one first user criterion and the at least one first user characteristic comprises determining the first user determined geographical location and the first geographical location, wherein the determining of the at least one second user criterion and the at least one second user characteristic comprises determining the second user determined geographical location and the second geographical location, wherein the comparing of at least one of the at least one first user characteristic with the at least one second user criterion and the at least one first user criterion with the at least one second user characteristic comprises comparing at least one of the first geographical location with the second user determined geographical location and the second geographical location with the first user determined geographical location, wherein the generating of the notification is further based on the comparing of at least one of the first geographical location with the second user determined geographical location and the second geographical location with the first user determined geographical location.

7. The method of claim 1 further comprising:
receiving, using the communication device, at least one interaction request from at least one of the first user device and the one or more second user devices;
analyzing, using the processing device, the at least one interaction request;
generating, using the processing device, at least one object for the digital content based on the analyzing of the at least one interaction request; and
transmitting, using the communication device, the at least one object to at least one of the first user device and the one or more second user devices, wherein the at least one object is displayed on the digital content accessed by at least one of the first user device and the one or more second user devices, wherein the first user interacts with the one or more second users on the digital content using the at least one object.

8. The method of claim 7 further comprising:
identifying, using the processing device, at least one third user associated with at least one of the first user and the one or more second users based on the analyzing of the at least one interaction request; and
transmitting, using the communication device, the at least one object to at least one third user device associated with the at least one third user, wherein the at least one object is displayed on the digital content accessed by the at least one third user device.

9. A system for facilitating interaction between users viewing same digital contents, the system comprising:
a communication device configured for:
receiving a first digital content request of a digital content, wherein the first digital content request is transmitted from a first user device associated with a first user to a first client device for accessing the digital content, wherein the first client device hosts the digital content;
receiving one or more second digital content requests of the digital content, wherein the one or more second digital content requests are transmitted from one or more second user devices associated with one or more second users to one or more second client devices for accessing the digital content, wherein the one or more second client devices host the digital content; and
transmitting a notification to at least one of the first user device and the one or more second user devices, wherein the notification informs the first user of simultaneous viewing of the digital content by the one or more second users and the one or more second users of the simultaneous viewing of the digital content by the first user;
a processing device communicatively coupled with the communication device, wherein the processing device is configured for:
analyzing the first digital content request and the one or more second digital content requests;

determining a simultaneous access of the digital content from the first user device and the one or more second user devices based on the analyzing; and generating the notification for the simultaneous access of the digital content based on the determining; and a storage device communicatively coupled with the communication device and the processing device, wherein the storage device is configured for:

retrieving first user information of the first user based on the first digital content request; and retrieving one or more second user information of the one or more second users based on the one or more second digital content requests, wherein the processing device is further configured for:

analyzing the first user information and the one or more second user information;

determining a user status for the first user and the one or more second users based on the analyzing of the first user information and the one or more second user information, wherein the generating of the notification is further based on the user status;

determining at least one digital content viewing metric of at least one of the first user and the one or more second users based on the analyzing of the first user information and the one or more second user information;

analyzing the at least one digital content viewing metric; and generating at least one reward for at least one of the first user and the one or more second users based on the analyzing of the at least one digital content viewing metric, wherein the communication device is further configured for transmitting the at least one reward to at least one of the first user device and the one or more second user devices.

10. The system of claim 9, wherein the receiving of the first digital content request comprises receiving the first digital content request from the first user device, wherein the first user device comprises a first plugin configured for generating the first digital content request based on the accessing of the digital content from the first user device, wherein the receiving of the one or more second digital content requests comprise receiving the one or more second digital content requests from the one or more second user devices, wherein the one or more second user devices comprises one or more second plugins configured for generating the one or more second digital content requests based on the accessing of the digital content from the one or more second user devices.

11. The system of claim 9, wherein the receiving of the first digital content request comprises receiving the first digital content request from the first client device, wherein the receiving of the one or more second digital content requests comprises receiving the one or more second digital content requests from the second client devices.

12. The system of claim 9, wherein the processing device is further configured for:

determining at least one first user criterion and at least one first user characteristic of the first user based on the analyzing of the first user information;

determining at least one second user criterion and at least one second user characteristic of the one or more second users based on the analyzing of the one or more second user information; and comparing at least one of the at least one first user characteristic with the at least one second user criterion and the at least one first user criterion with the at least one second user characteristic, wherein the generating of the notification is further based on the comparing of at least one of the at least one first user characteristic with the at least one second user criterion and the at least one first user criterion with the at least one second user characteristic.

13. The system of claim 12, wherein the at least one first user criterion comprises a first user determined proximity of the one or more second users to the first user, wherein the at least one first user characteristic comprises a first proximity of the first user to the one or more second users, wherein the at least one second user criterion comprises a second user determined proximity of the first user to the one or more second users, wherein the at least one second user characteristic comprises a second proximity of the one or more second users to the first user, wherein the determining of the at least one first user criterion and the at least one first user characteristic comprises determining the first user determined proximity and the first proximity, wherein the determining of the at least one second user criterion and the at least one second user characteristic comprises determining the second user determined proximity and the second proximity, wherein the comparing of at least one of the at least one first user characteristic with the at least one second user criterion and the at least one first user criterion with the at least one second user characteristic comprises comparing at least one of the first proximity with the second user determined proximity and the second proximity with the first user determined proximity, wherein the generating of the notification is further based on the comparing of at least one of the first proximity with the second user determined proximity and the second proximity with the first user determined proximity.

14. The system of claim 12, wherein the at least one first user criterion comprises a first user determined geographical location of the one or more second users to the first user, wherein the at least one first user characteristic comprises a first geographical location of the first user to the one or more second users, wherein the at least one second user criterion comprises a second user determined geographical location of the first user to the one or more second users, wherein the at least one second user characteristic comprises a second geographical location of the one or more second users to the first user, wherein the determining of the at least one first user criterion and the at least one first user characteristic comprises determining the first user determined geographical location and the first geographical location, wherein the determining of the at least one second user criterion and the at least one second user characteristic comprises determining the second user determined geographical location and the second geographical location, wherein the comparing of at least one of the at least one first user characteristic with the at least one second user criterion and the at least one first user criterion with the at least one second user characteristic comprises comparing at least one of the first geographical location with the second user determined geographical location and the second geographical location with the first user determined geographical location, wherein the generating of the notification is further based on the comparing of at least one of the first geographical location with the second user determined geographical location and the second geographical location with the first user determined geographical location.

15. The system of claim 9, wherein the communication device is further configured for:

receiving at least one interaction request from at least one of the first user device and the one or more second user devices; and transmitting at least one object to at least one of the first user device and the one or more second user devices, wherein the at least one object is displayed on the digital content accessed by at least one of the first user device and the one or more second user devices, wherein the first user interacts with the one or more second users on the digital content using the at least one object, wherein the processing device is further configured for:

analyzing the at least one interaction request; and generating the at least one object for the digital content based on the analyzing of the at least one interaction request.

16. The system of claim 15, wherein the processing device is further configured for identifying at least one third user associated with at least one of the first user and the one or more second users based on the analyzing of the at least one interaction request, wherein the communication device is further configured for transmitting the at least one object to at least one third user device associated with the at least one third user, wherein the at least one object is displayed on the digital content accessed by the at least one third user device.

\* \* \* \* \*